US012731236B2

(12) United States Patent
Sohn et al.

(10) Patent No.: US 12,731,236 B2
(45) Date of Patent: Sep. 8, 2026

(54) METHOD OF MEASURING STRUCTURE DISPLACEMENT BASED ON FUSION OF ASYNCHRONOUS VISION MEASUREMENT DATA OF NATURAL TARGET AND ACCELERATION DATA OF STRUCTURE, AND SYSTEM FOR THE SAME

(71) Applicant: Korea Advanced Institute of Science and Technology, Daejeon (KR)

(72) Inventors: Hoon Sohn, Daejeon (KR); Jae Mook Choi, Daejeon (KR); Zhanxiong Ma, Daejeon (KR); Ki Young Kim, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 342 days.

(21) Appl. No.: 18/554,919

(22) PCT Filed: Mar. 11, 2022

(86) PCT No.: PCT/KR2022/003490
§ 371 (c)(1),
(2) Date: Oct. 11, 2023

(87) PCT Pub. No.: WO2022/220414
PCT Pub. Date: Oct. 20, 2022

(65) Prior Publication Data
US 2024/0202898 A1 Jun. 20, 2024

(30) Foreign Application Priority Data
Apr. 12, 2021 (KR) ........................ 10-2021-0047367

(51) Int. Cl.
*G06T 7/00* (2017.01)
*G01B 21/32* (2006.01)
(Continued)

(52) U.S. Cl.
CPC ............ *G06T 7/0002* (2013.01); *G01P 15/00* (2013.01); *G06T 5/20* (2013.01); *G06T 5/70* (2024.01);
(Continued)

(58) Field of Classification Search
CPC ....... G06T 7/0002; G06T 7/277; G06T 7/248; G06T 5/70; G06T 5/20; G06T 2207/20004; G06T 2207/30184; G01P 15/00
See application file for complete search history.

(56) References Cited

FOREIGN PATENT DOCUMENTS

| | | | |
|---|---|---|---|
| CN | 103234462 A | * | 8/2013 |
| KR | 10-1803503 B1 | | 11/2017 |

(Continued)

OTHER PUBLICATIONS

Park, Jong-Woong, et al. "Visual-inertial displacement sensing using data fusion of vision-based displacement with acceleration." Structural Control and Health Monitoring 2018. (Year: 2018).*

(Continued)

*Primary Examiner* — Oneal R Mistry
*Assistant Examiner* — Nhut Huy Pham
(74) *Attorney, Agent, or Firm* — DALY, CROWLEY, MOFFORD & DURKEE, LLP

(57) ABSTRACT

Disclosed are a method and a system for measuring a displacement of a structure based on fusion of asynchronous vision measurement data of natural target and acceleration data of the structure. A scale factor, which is a conversion factor between a pixel resolution of the image frame data and a distance resolution of real space, is calculated using image frame data taken at a predetermined first sample frequency of a stationary target outside the structure by a camera installed on the structure, and acceleration data measured at a predetermined second sample frequency by an
(Continued)

100 accelerometer installed on the structure, over time. A vision-based displacement value of the structure is estimated using a feature point matching algorithm and the scale factor.

16 Claims, 13 Drawing Sheets

(51) Int. Cl.

| | |
|---|---|
| ***G01D 21/02*** | (2006.01) |
| ***G01P 15/00*** | (2006.01) |
| ***G06T 5/20*** | (2006.01) |
| ***G06T 5/70*** | (2024.01) |
| ***G06T 7/246*** | (2017.01) |
| ***G06T 7/277*** | (2017.01) |

(52) U.S. Cl.

CPC .............. *G06T 7/248* (2017.01); *G06T 7/277* (2017.01); *G06T 2207/20004* (2013.01); *G06T 2207/30184* (2013.01)

(56) References Cited

FOREIGN PATENT DOCUMENTS

| | | |
|---|---|---|
| KR | 10-1996779 B1 | 7/2019 |
| KR | 10-2200824 B1 | 1/2021 |
| KR | 10-2230397 B1 | 3/2021 |

OTHER PUBLICATIONS

Tian, Ya, William R. Hamel, and Jindong Tan. “Accurate human navigation using wearable monocular visual and inertial sensors.” IEEE, 2013 (Year: 2013).*

Armesto, Leopoldo, et al. “Multi-rate fusion with vision and inertial sensors.” IEEE , 2004. (Year: 2004).*

Park, Jong-Woong, et al. “Visual-inertial displacement sensing using data fusion of vision-based displacement with acceleration.” Structural Control and Health Monitoring (Year: 2018).*

Tian, Ya, William R. Hamel, and Jindong Tan. “Accurate human navigation using wearable monocular visual and inertial sensors.” IEEE (Year: 2013).*

Chang et al., “An Integrated Visual-Inertial Technique for Structural Displacement and Velocity Measurement;” Proceedings of Smart Structures and Systems, vol. 6, No. 9; Accepted May 19, 2010; pp. 1025-1039; 15 Pages.

Kim et al., “Dynamic Displacement Estimation by Fusing Biased High-Sampling Rate Acceleration and Low-Sampling Rate Displacement Measurements Using Two-Stage Kalman Estimator;” Proceedings of Smart Structures and Systems, vol. 17, No. 4; Accepted Feb. 20, 2016; pp. 647-667; 21 Pages.

Park et al., “Displacement Estimation Using Multimetric Data Fusion;” Proceedings of IEEE/ASME Transactions on Mechatronics, vol. 18, No. 6; Dec. 2013; 8 Pages.

Park et al., “Traffic Safety Evaluation for Railway Bridges Using Expanded Multisensor Data Fusion;” Proceedings of Computer-Aided Civil and Infrastructure Engineering, No. 31; Published Jun. 16, 2016; pp. 749-760; 12 Pages.

Smyth et al., “Multi-Rate Kalman Filtering for the Data Fusion of Displacement and Acceleration Response Measurements in Dynamic System Monitoring;” Proceedings of Mechanical Systems and Signal Processing, No. 21; Available May 19, 2006; pp. 706-723; 18 Pages.

Xu et al., “Accurate Deformation Monitoring on Bridge Structures Using a Cost-Effective Sensing System Combined with a Camera and Accelerometers: Case Study;” Proceedings of the Journal of Bridge Engineering, vol. 24, No. 1; Published Nov. 13, 2018; 14 Pages.

PCT International Search Report dated Jul. 12, 2022 for International Application No. PCT/KR2022/003490; 4 Pages.

* cited by examiner

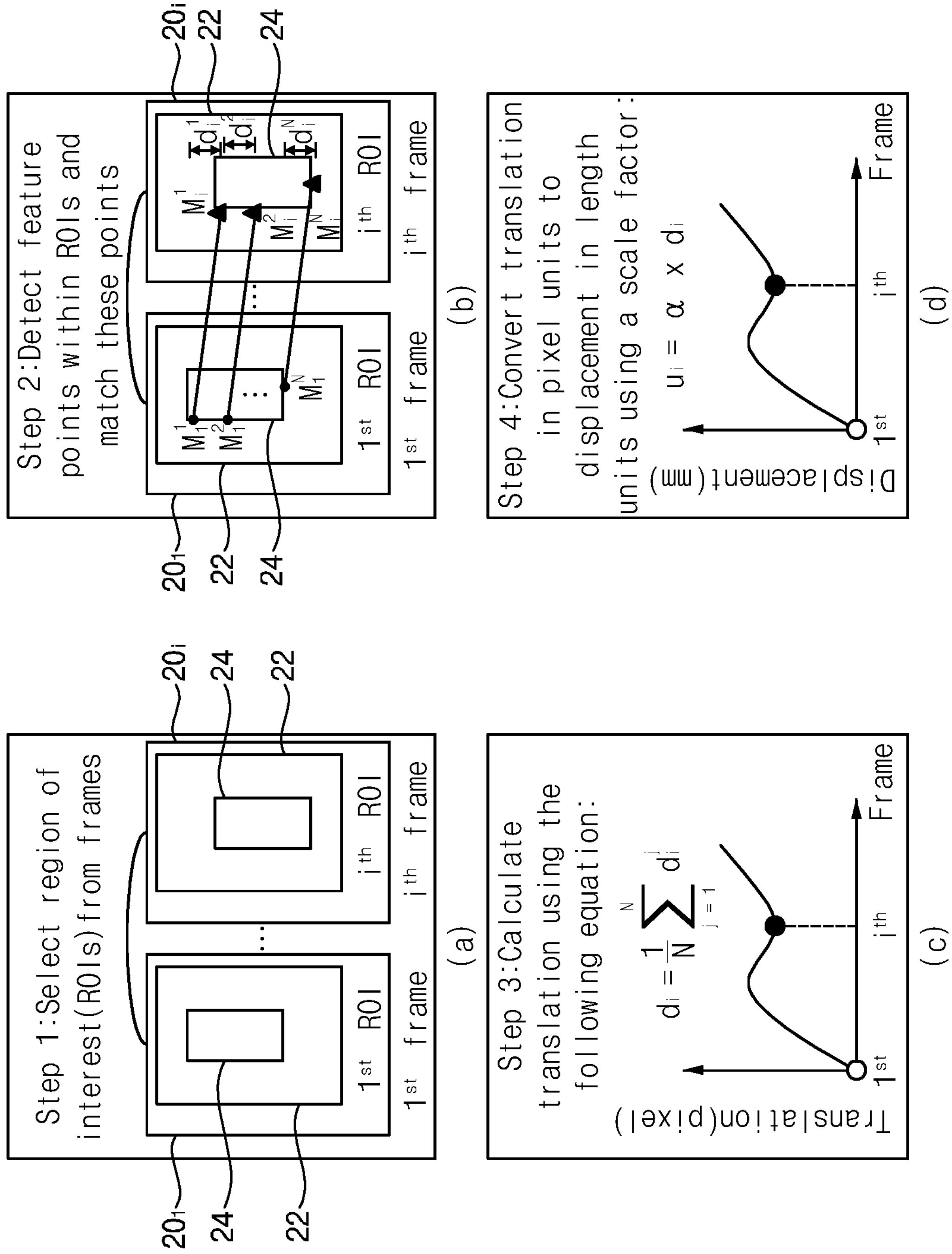

FIG. 2

Step 1:Select region of interest(ROIs)from frames $20_1$ 24 22 $20_i$ 24 22

$1^{st}$ ROI $i^{th}$ ROI $1^{st}$ frame $i^{th}$ frame (a)

Step 2:Detect feature points within ROIs and match these points $20_1$ 22 24 $20_i$ 22 24

$M_1^1$ $M_1^2$ $M_1^N$ $M_i^1$ $M_i^2$ $M_i^N$ $d_i^1$ $d_i^2$ $d_i^N$ $1^{st}$ ROI $i^{th}$ ROI $1^{st}$ frame $i^{th}$ frame (b)

Step 3:Calculate translation using the following equation:

$$d_i = \frac{1}{N}\sum_{j=1}^{N} d_i^j$$

Translation(pixel)

$1^{st}$ $i^{th}$ Frame (c)

Step 4:Convert translation in pixel units to displacement in length units using a scale factor:

$$u_i = \alpha \times d_i$$

Displacement(mm)

$1^{st}$ $i^{th}$ Frame (d)

START
S100
S200
(1)Scale Factor Estimation
(2)Real-time Displacement Estimation
Vision Measurements
Acceleration Measurements
Time
Time
Automatic Scale Factor Estimation
150
Adaptive Multi-rate Kalman Filter+ Improved Feature Matching Algorithm
160
Scale Factor(α)
Estimated Displacement
Time
END $$u_i = \alpha\left\{\frac{1}{N_g}\left(\sum_{j=1}^{N_g} d_i^j\right) + d_i^{ROI}\right\}$$

S200

Start

Vision Measurement at $t = (i-1)\Delta t_d$ S210

A i = i +1

S212 $i^{th}$ Frame

S214 ROI updating

S216 $i^{th}$ ROI

B

S218 Feature Matching

S220 Mismatch Rejection I & II

S222 Good Matches

Scale Factor( α )

Translation Estimation S224

Estimated Displacement($u_i$)

C

S226

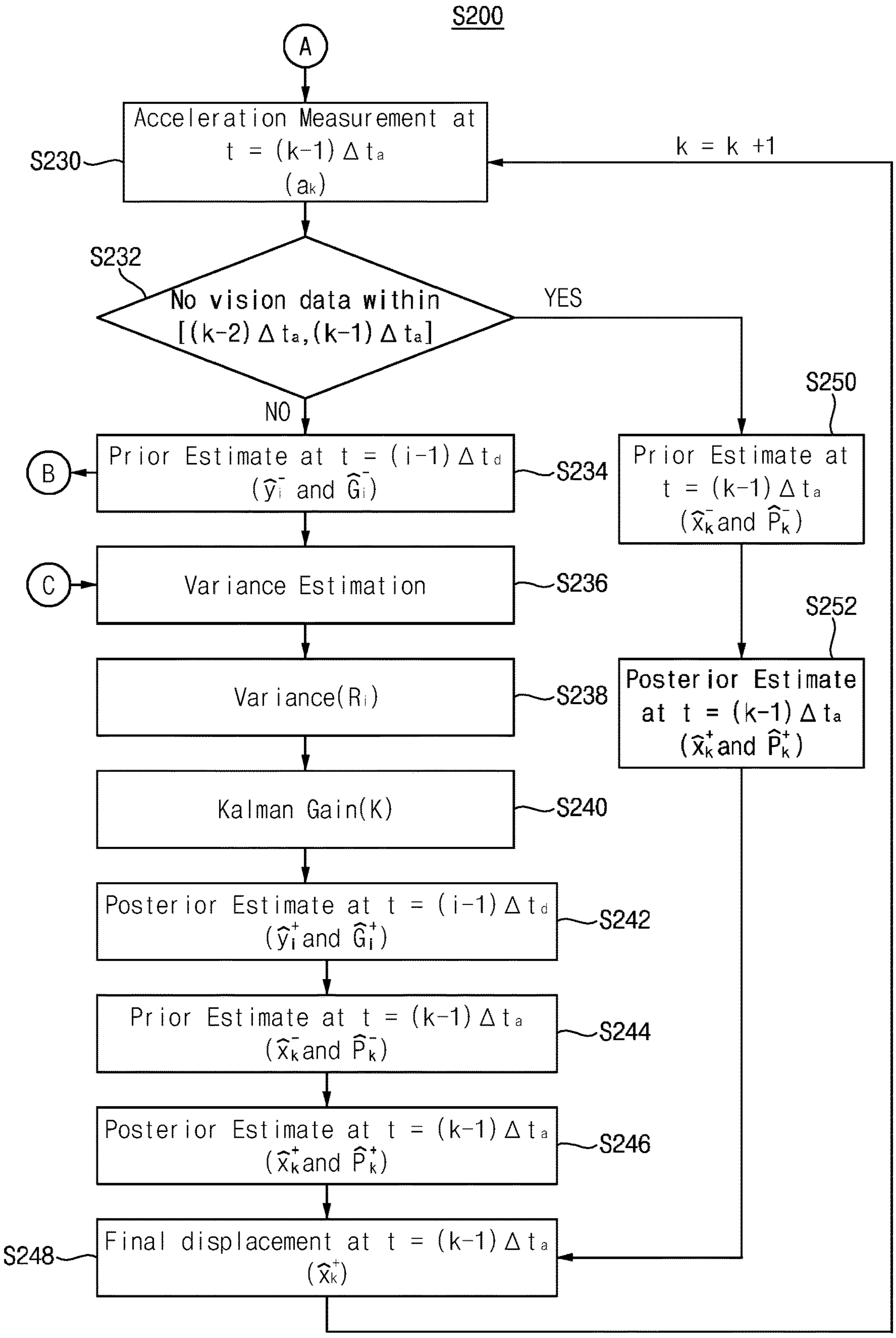

FIG. 7B
S200
A
S230
Acceleration Measurement at
t = (k-1) Δ ta
(ak)
k = k +1
S232
No vision data within
[(k-2) Δ ta,(k-1) Δ ta]
YES
NO
B
Prior Estimate at t = (i-1) Δ td
($\hat{y}_i^-$ and $\hat{G}_i^-$)
S234
S250
Prior Estimate at
t = (k-1) Δ ta
($\hat{x}_k^-$ and $\hat{P}_k^-$)
C
Variance Estimation
S236
S252
Posterior Estimate
at t = (k-1) Δ ta
($\hat{x}_k^+$ and $\hat{P}_k^+$)
Variance($R_i$)
S238
Kalman Gain(K)
S240
Posterior Estimate at t = (i-1) Δ td
($\hat{y}_i^+$ and $\hat{G}_i^+$)
S242
Prior Estimate at t = (k-1) Δ ta
($\hat{x}_k^-$ and $\hat{P}_k^-$)
S244
Posterior Estimate at t = (k-1) Δ ta
($\hat{x}_k^+$ and $\hat{P}_k^+$)
S246
S248
Final displacement at t = (k-1) Δ ta
($\hat{x}_k^+$)

(A)

$d_i^{TOI} = \frac{\hat{\bar{y}}_i(1)}{\alpha}$

TOI $1^{st}$ ROI $1^{st}$ frame $d_i^{TOI}$

TOI $i^{th}$ frame (B)

$d_i^{TOI} = round(d_i^{TOI})$

TOI $1^{st}$ ROI $1^{st}$ frame $d_i^{TOI}$

TOI $i^{th}$ ROI $i^{th}$ frame (A)

1st ROI ith ROI (B)

$\mu^s = 1 - \min(l_1^s, l_i^s)/\max(l_1^s, l_i^s)$ sth Group $l_1^s$ $l_i^s$

1st ROI ith ROI (C)

Best group

Best match $M_1^r$ $M_i^r$

1st ROI ith ROI

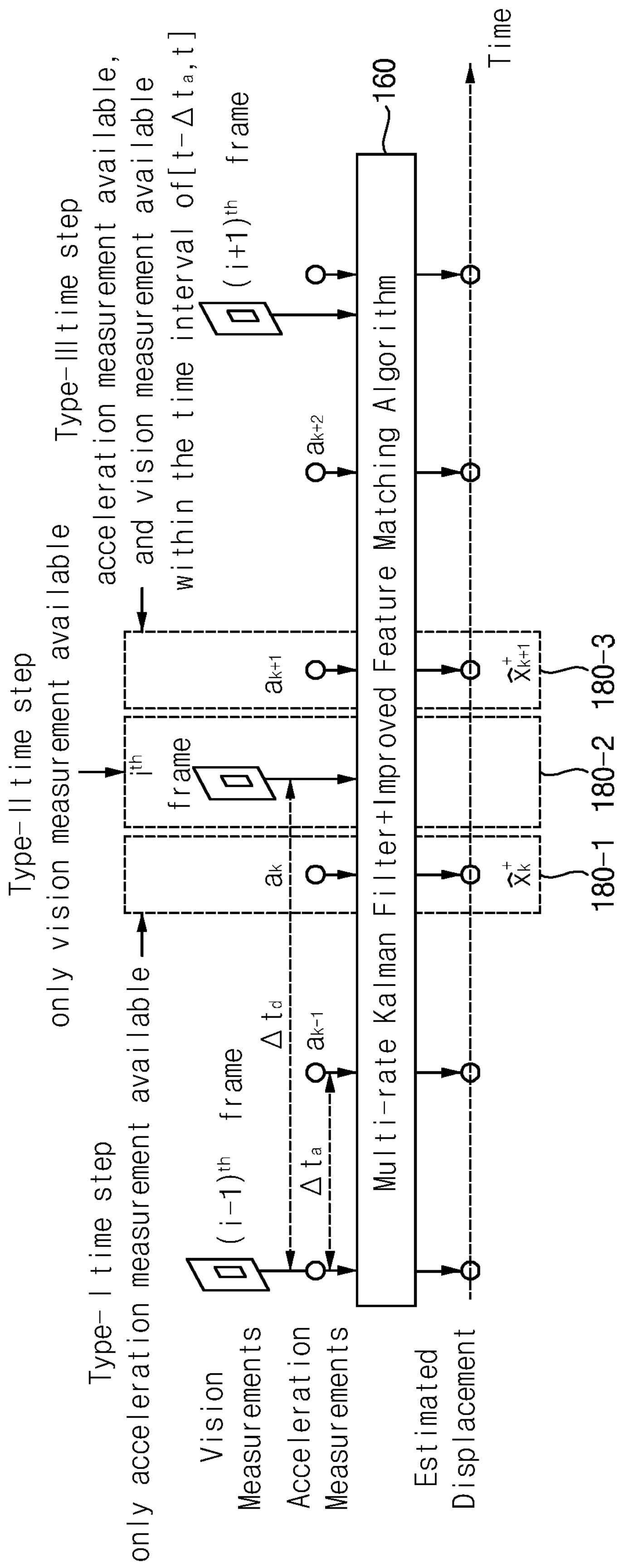

FIG. 11
Vision Measurements
Acceleration Measurements
Estimated Displacement
Type- I time step
only acceleration measurement available
Type- II time step
only vision measurement available
Type- III time step
acceleration measurement available,
and vision measurement available
within the time interval of[t-Δt_a, t]
(i-1)th frame
ith frame
(i+1)th frame
Δt_a
Δt_d
a_{k-1}
a_k
a_{k+1}
a_{k+2}
Multi-rate Kalman Filter+Improved Feature Matching Algorithm
160
x̂_k^+
x̂_{k+1}^+
180-1
180-2
180-3
Time

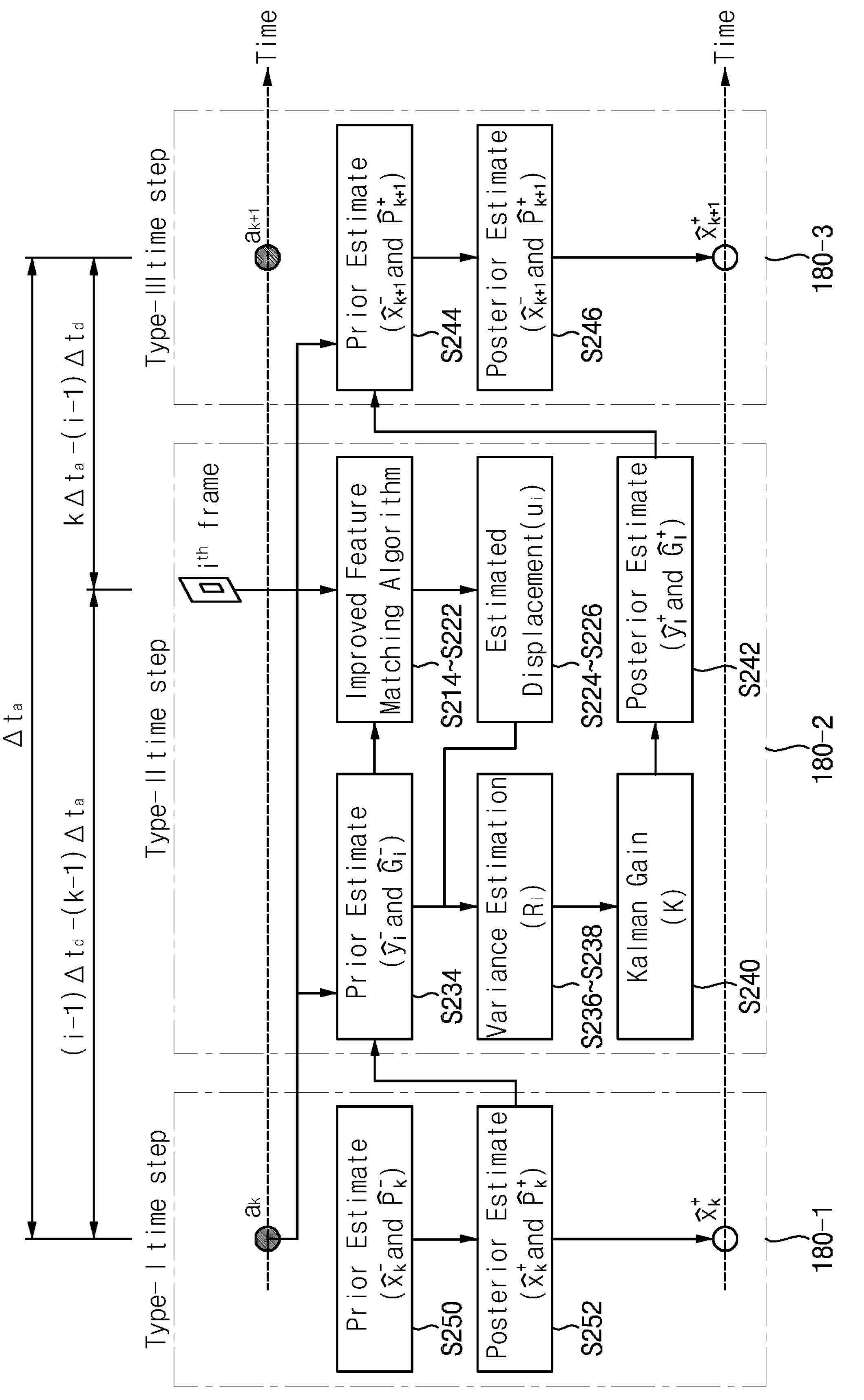

FIG. 12
Δ t_a
(i-1) Δ t_d -(k-1) Δ t_a
k Δ t_a -(i-1) Δ t_d
Type-I time step
Type-II time step
Type-III time step
i^th frame
a_k
a_k+1
Time
Prior Estimate (x̂_k^- and P̂_k^-)
S250
Posterior Estimate (x̂_k^+ and P̂_k^+)
S252
Prior Estimate (ŷ_i^- and Ĝ_i^-)
S234
Improved Feature Matching Algorithm
S214~S222
Variance Estimation (R_i)
S236~S238
Estimated Displacement(u_i)
S224~S226
Kalman Gain (K)
S240
Posterior Estimate (ŷ_i^+ and Ĝ_i^+)
S242
Prior Estimate (x̂_k+1^- and P̂_k+1^+)
S244
Posterior Estimate (x̂_k+1^- and P̂_k+1^+)
S246
x̂_k^+
x̂_k+1^+
Time
180-1
180-2
180-3

METHOD OF MEASURING STRUCTURE DISPLACEMENT BASED ON FUSION OF ASYNCHRONOUS VISION MEASUREMENT DATA OF NATURAL TARGET AND ACCELERATION DATA OF STRUCTURE, AND SYSTEM FOR THE SAME

CROSS REFERENCE TO RELATED APPLICATIONS

This application is a U.S. National Stage Application of International application No. PCT/KR 2022/003490 filed on Mar. 11, 2022 which is based upon and claims the benefit of priority to Korean Patent Application No. 10-2021-0047367 filed on Apr. 12, 2021 in the Korean Intellectual Property Office. The disclosures of the above-listed applications are hereby incorporated by reference herein in their entirety.

BACKGROUND

1. Technical Field

The present invention relates to a field of displacement measurement technology, and more particularly to a method and system for measuring displacement of a structure in real time using acceleration data and vision measurement data together.

2. Description of the Related Art

Displacement plays an important role in the assessment, monitoring, and control of civil infrastructure, as it provides crucial information relating to structural integrity and health. Several techniques are available for direct displacement measurement.

Most displacement measurement sensors require a rigid fixed support point that does not move during installation, which limits their use on large structures. A linear variable differential transformer (LVDT) is a piston-shaped sensor with an elongated cylindrical structure about 50 cm long. It may be installed in such a way that one end of it is attached to a structure and the other end to a fixed support point, i.e. it is placed between a target point on the structure and a fixed reference point to measure the relative displacement. The LVDT can measure displacement with high accuracy. However, when installed on structures such as bridges, it is often difficult to secure a support point at a distance of 50 cm from the measurement point, and additional installation means such as temporary structures are required, which is not convenient for practical applications.

The use of a real-time kinematic global navigation satellite system (RTK-GNSS) is another option for measuring displacement. The GPS-RTK is a sensor that does not require the installation of a fixed support point and utilizes two GPS sensors. One set of GNSS antennas and receivers is placed at a target point on the structure to be measured, while the other set is placed at a fixed reference point within a predetermined distance from the structure. The antennas at both points receive carrier waves from multiple satellites simultaneously, so the displacement from the target point can be calculated based on the phase difference between the carrier waves received at the two measurement points. However, RTK-GNSS typically has a low sampling rate of up to 20 Hz, and its accuracy is limited to about 7-10 mm. Measurement accuracy decreases dramatically when the number of satellites received by the sensor is less than four, weather conditions are poor, or the view of the GNSS antenna is obstructed by nearby moving objects or debris. Moreover, it cannot work in GNSS-denied environments.

Vision cameras are sometimes used for displacement estimation. The vision camera tracks the movement of man-made or natural targets on a target structure based on template matching techniques, optical flow techniques, feature matching algorithms, etc. In this vision-based technique, the translation is first estimated in pixel units from the image frames obtained from vision measurements, and then the estimated translation is converted to a displacement in length unit using a scale factor. The converted displacement corresponds to the length traveled in real space.

However, these prior arts suffer from the following disadvantages or limitations. The scale factor can be estimated by identifying the size of the target in physical units in advance. However, it may be difficult to manually measure the size of a target in the field. Furthermore, the method requires additional maintenance, such as a fixed support point on which the vision camera is mounted, and may require a separate artificial target to be installed, which increases the cost. The prior arts have a relatively high computational cost, which hinders real-time estimation of displacement at a high sampling rate. In addition, due to the relatively low sampling frequency of the vision camera, most of the measurement results are contaminated with noises, which may limit the accuracy of the measurement.

On the other hand, displacement estimation techniques based on data fusion have also been proposed. These techniques combine multiple measurements from different modalities to produce more accurate displacement estimates. Examples include techniques based on fusion of RTK-GNSS and accelerometers (see prior art document (1) below) and techniques based on fusion of strain gauges and accelerometers (see prior art documents (2) and (3) below). However, the former has the limitation that it cannot be used in GNSS-denied environments, and the latter requires prior knowledge of the mode shapes of the target structure.

There have also been attempts to fuse vision cameras and accelerometers (see prior art documents (4) and (5) below). A low-sampling rate displacement obtained from the vision measurement and a high-sampling rate acceleration measurement are fused by a multi-rate Kalman filter to estimate a high-sampling rate displacement. However, these techniques, as illustrated in FIG. 1, involve placing an artificial target on the structure to be measured and imaging the artificial target with a vision camera mounted at an external, fixed point away from the structure. Thus, this prior art is not immune to the disadvantages or limitations of the vision camera-based displacement measurement method depicted in FIG. 1. This is, these techniques still require prior knowledge of the actual length of a target object in order to estimate the scale factor. They are also limited in that they can only be used under conditions where there is synchronization between the vision measurement and the acceleration measurement.

The background technologies relevant to the present invention includes (1) Kim, K., Choi, J., Koo, G. & Sohn, H. (2016), Dynamic displacement estimation by fusing biased high-sampling rate acceleration and low-sampling rate displacement measurements using two-stage Kalman estimator, Smart Structures and Systems, 17(4), 647-667.

(2) Park, J. W., Sim, S. H. & Jung, H. J. (2013), Displacement estimation using multimetric data fusion, IEEE/ASME Transactions on Mechatronics, 18(6), 1675-1682.

(3) Park, J. W., Lee, K. C., Sim, S. H., Jung, H. J. & Spencer Jr, B. F. (2016), Traffic safety evaluation for railway bridges using expanded multi-sensor data fusion, Computer-Aided Civil and Infrastructure Engineering, 31(10), 749-760.
(4) Chang, C. C. & Xiao, X. H. (2010), An integrated visual-inertial technique for structural displacement and velocity measurement, Smart Structures and Systems, 6(9), 1025-1039.
(5) Xu, Y, Brownjohn, J. M. W. & Huseynov, F. (2019), Accurate deformation monitoring on bridge structures using a cost-effective sensing system combined with a camera and accelerometers: case study, Journal of Bridge Engineering, 24(1).
(6) Smyth, A. & Wu, M. (2007), Multi-rate Kalman filtering for the data fusion of displacement and acceleration response measurements in dynamic system monitoring, Mechanical Systems and Signal Processing, 21(2), 706-723.

SUMMARY

Technical Task

It is an object of the present invention to provide a method and system for measuring displacement of a structure with low maintenance cost and high accuracy based on fusion of acceleration measurement data of the structure and video measurement data of a natural target outside the structure measured by an accelerometer and a vision camera installed on the structure to be measured, respectively.

It is another object of the present invention to provide a method and a system for measuring displacement of a structure by fusing asynchronous vision measurement data of a natural target and acceleration measurement data of the structure, wherein the displacement of the structure can be accurately measured by automatically calculating a scale factor for translation of the vision measurement data using the acceleration measurement data of the structure and applying an improved feature matching algorithm to the vision measurement data.

It is still another object of the present invention to provide a method and a system for measuring the displacement of a structure based on the fusion of asynchronous vision measurement of a natural target and acceleration data of the structure, wherein the asynchronous low-speed sampling vision measurement and the high-speed sampling acceleration measurement are fused with an adaptive multi-rate Kalman filter to measure the displacement of the structure with a high sampling rate and improved accuracy.

The objects of the present invention are not limited to those described above, and may be expanded in various ways without departing from the spirit and scope of the present invention.

Technical Solution

A method of measuring a displacement of a structure, according to embodiments to realize one object of the present invention, includes: calculating a scale factor (α), which is a conversion factor between a pixel resolution of the image frame data and a distance resolution of real space, by a processor, using a series of image frame data taken at a predetermined first sample frequency of a stationary target outside the structure by a camera installed on the structure to be measured over time, and a series of acceleration data measured at a predetermined second sample frequency by an accelerometer installed on the structure; and calculating a vision-based displacement value of the structure, by the processor, using a feature point matching algorithm and the scale factor, and computing a displacement estimate of the structure at a sample frequency of the acceleration data, by the processor, by seamlessly fusing asynchronous the image frame data and the acceleration data to be synchronized with each other with noise reduced using an adaptive multi-rate Kalman filter while using the vision-based displacement value.

In exemplary embodiments, the 'calculating a scale factor (α)' may include estimating a pixel-wise translation of the feature points by using with a feature point matching algorithm for comparing predetermined feature points between a reference image frame and a comparative image frame to match the same feature points; and estimating a length-wise displacement in real space by double-integrating the acceleration data.

In exemplary embodiments, the 'calculating a scale factor (α)' may further include subjecting the estimate of pixel-wise translation and the estimate of length-wise displacement to bandpass filtering processing for reducing noise.

In exemplary embodiments, in the bandpass filtering processing, the sampling frequency of the camera may be at least 10 times higher than the highest frequency of a frequency component of the image frame.

In exemplary embodiments, the 'calculating a scale factor (α)' may further include down-sampling the bandpass filtered estimate of the length-wise displacement to synchronize the estimate of the length-wise displacement with the estimate of the translation.

In exemplary embodiments, the scale factor (α) may be a slope between the two values obtained by comparing the bandpass-filtered estimate of the translation with the bandpass-filtered estimate of the displacement ($u^f(t)$).

In exemplary embodiments, the scaling factor (α) may be obtained by applying a least-squares method or a RANSAC (RANdom SAmple Consensus) algorithm to an estimate ($d^f(t)$) of the bandpass-filtered translation and an estimate ($u^f(t)$) of down-sampled displacement.

In exemplary embodiments, the 'computing a displacement estimate of the structure', may comprise updating a region of interest (ROI) of an $i^{th}$ image frame; matching N feature points within a ROI of a first image frame with N feature points within the ROI of the $i^{th}$ image frame using a predetermined feature point matching algorithm; rejecting feature point mismatches to leave only good feature point matches among the N feature point matches using a mismatch rejection algorithm; and computing a final translation estimate by using an equation of $$u_i = \alpha\left\{\frac{1}{N_g}\left(\sum_{j=1}^{N_g} d_i^j\right) + d_i^{ROI}\right\},$$

where $N_g$ denotes number of the good feature point matches, in which the scale factor (α) is applied to a sum of the translations of the good feature point matches and movements of the ROIs.

In exemplary embodiments, the 'updating a ROI of an $i^{th}$ image frame' may include converting a prior state estimate of the displacement from length-wise one to pixel-wise one using the scale facto; obtaining a pixel-wise displacement $$(d_i^{TOI})$$

of a target of interest (TOI) of the $i^{th}$ image frame by using converted pixel-wise prior state estimate; obtaining a translation $$(d_i^{TOI})$$

the $i^{th}$ ROI using a round function, $$d_i^{ROI} = \text{round}\left(\frac{\tilde{y}_i^-(1)}{\alpha}\right);$$

and updating a position of the $i^{th}$ ROI using the obtained translation $$(d_i^{TOI})$$

of the $i^{th}$ ROI.

In exemplary embodiments, the 'rejecting feature point mismatches to leave only good feature point matches' may include rejecting feature point mismatches using a first feature point mismatch rejection algorithm, wherein the first feature point mismatch rejecting algorithm comprises: selecting a best feature point match from the feature point matches; and rejecting mismatched feature points by cross-checking remaining feature points based on the best feature point match.

In exemplary embodiments, the 'selecting a best feature point match' may include: pairing N feature point matches between the ROI of the first image frame and the ROI of the $i^{th}$ image frame two by two into N/2 or (N−1)/2 feature point match groups; calculating a distance variation index of each of the N/2 or (N−1)/2 feature point match groups; selecting a match group having the smallest distance variation index ($\mu^s$) among the calculated N/2 or (N−1)/2 distance variation indices as a best match group; and selecting one of the two feature point matches belonging to the best match group as the best feature point match.

In exemplary embodiments, the 'rejecting mismatched feature points' may include: calculating a distance interval for each of the remaining feature point matches based on the best match selected to determine whether the calculated distance interval meets a mismatch condition; and rejecting, from the feature point matches, a feature point that meets the mismatch condition, leaving only good matches.

In exemplary embodiments, the mismatch condition may include first and second distance interval conditions, the first distance interval condition being that 'a maximum distance between a $j^{th}$ feature point and the best matched feature point within the ROI of the $1^{st}$ image frame' is greater than or equal to 'a minimum distance between the $j^{th}$ feature point and the best matched feature point within the ROI of the $i^{th}$ image frame', and the second distance interval condition being that 'a maximum distance between a $j^{th}$ feature point and the best matched feature point within the ROI of the $i^{th}$ image frame' is greater than or equal to 'a minimum distance between the $j^{th}$ feature point and the best matched feature point within the ROI of the $1^{st}$ image frame', where j=1, 2, . . . , N.

In exemplary embodiments, the distance variation index may be calculated by an equation of $$\mu^s = 1 - \min(l_1^s, l_i^s)/\max(l_1^s, l_i^s),$$

where $\mu^s$ is a distance variation index of a $s^{th}$ match group, $$l_1^s$$

is a distance between two feature points in the $s^{th}$ match group within the ROI of the $1^{st}$ image frame, and $$l_i^s$$

is a distance between two features points in the $s^{th}$ match group within the ROI of the $i^{th}$ image frame.

In exemplary embodiments, the 'rejecting feature point mismatches to leave only good feature point matches' may include rejecting the feature point mismatches using a second feature point mismatch rejection algorithm, and wherein the second feature point mismatch rejection algorithm comprises calculating a translation $$(d_i^j)$$

for each of remaining feature point matches filtered by the first feature point mismatch rejection algorithm; and rejecting a feature point match of which translation calculated does not fall within a range of translation value $$(d_i^j)$$

expressed by an equation of $$\frac{\tilde{y}_i^-(1)}{\alpha} - \frac{\sqrt[3]{\tilde{G}_i^-(1,1)}}{\alpha} - 2\varepsilon - d_i^{ROI} \le d_i^j \le \frac{\tilde{y}_i^-(1)}{\alpha} + \frac{\sqrt[3]{\tilde{G}_i^-(1,1)}}{\alpha} + 2\varepsilon - d_i^{ROI}$$

as mismatches.

In exemplary embodiments, the 'seamlessly fusing asynchronous the image frame data and the acceleration data' may include, in a Type-I time step in which only a current acceleration data ($a_k$) is available and no image frame data is available in a time interval $[(k-2)\Delta t_a, (k-1)\Delta t_a]$ between the current acceleration data ($a_k$) and a previous acceleration data ($a_{k-1}$), obtaining a prior state estimate $$(\hat{x}_k^-)$$

of the displacement and an error covariance matrix $$(\hat{P}_k^-)$$

of the prior state estimate $$(\hat{x}_k^-)$$

using a first equation, $$\hat{x}_k^- = A(\Delta t_a)\hat{x}_{k-1}^+ + B(\Delta t_a)a_{k-1},$$

and a second equation, $$\hat{P}_k^- = A(\Delta t_a)\hat{P}_{k-1}^+ A^T(\Delta t_a) + qB(\Delta t_a)B^T(\Delta t_a),$$

respectively; and at time (k−1)$\Delta t_a$, obtaining a posterior state estimate $$(\hat{x}_k^+)$$

and a posterior error covariance matrix $$(\hat{P}_k^+)$$

of the posterior state estimate $$(\hat{x}_k^+)$$

corresponding to the prior state estimate $$(\hat{x}_k^-)$$

and the error covariance matrix $$(\hat{P}_k^-)$$

of the prior state estimate $$(\hat{x}_k^-),$$

where $\Delta t_a$ denotes a time interval between the acceleration data, k denotes a $k^{th}$ time interval of the acceleration data, and $$\hat{x}_{k-1}^+$$

and $a_{k-1}$ denotes the posterior state estimate and acceleration data, respectively, at a 'previous time step', and $$A(\Delta t_a) = \begin{bmatrix} 1 & \Delta t_a \\ 0 & 1 \end{bmatrix}, B(\Delta t_a) = \begin{bmatrix} \Delta t_a^t/2 \\ \Delta t \end{bmatrix}.$$

In exemplary embodiments, the 'seamlessly fusing asynchronous the image frame data and the acceleration data' may include, in a Type-II time step in which only the image frame data is available and the acceleration data is not available within a time interval [(k−2)$\Delta t_a$, (k−1)$\Delta t_a$], estimating obtaining a prior state estimate $$(\hat{y}_i^-)$$

of the displacement and a prior error covariance matrix $$(\hat{G}_i^-)$$

of the prior state estimate $$(\hat{y}_i^-)$$

of the displacement using the first and second equations, with changing the time interval from $\Delta t_a$ to (i−1)$\Delta t_d$−(k−1)$\Delta t_a$; updating the ROI of the $i^{th}$ image frame using the obtained prior state estimate $$(\hat{y}_i^-)$$

and the prior error covariance matrix $$(\hat{G}_i^-)$$

thereof; obtaining a vision-based displacement ($u_i$) estimate by applying the obtained prior state estimate $$(\hat{y}_i^-)$$

and the prior error covariance matrix $$(\hat{G}_i^-)$$

thereof to the feature point mismatch rejection based on the first and second feature point mismatch rejection algorithms; obtaining a noise variance ($R_i$) of the vision-based displacement ($u_i$) by using the obtained prior state estimate $$(\hat{y}_i^-)$$

of the displacement, the prior error covariance matrix $$(\hat{G}_i^-)$$

thereof, and the vision-based displacement ($u_i$) estimate; calculating a Kalman gain (K) using an equation of $$K = \hat{P}_k^- H^T \left(H \hat{P}_k^- H^T + R\right)^{-1}$$

and the obtained noise variance ($R_i$) of the vision-based displacement ($u_i$); and calculating a posterior state estimate $$(\hat{y}_i^-)$$

of the displacement at time t=(i−1)$\Delta t_d$ and an error covariance matrix $$(\hat{G}_i^-)$$

thereof using equations $$\hat{x}_k^+ = (I - KH)\hat{x}_k^- + Ku_k \text{ and } \hat{P}_k^+ = (I - KH)\hat{P}_k^-$$

and the Kalman gain (K), where in the above equations, x and P are represented by y and G, respectively, H being a vector [1, 0], i being an $i^{th}$ time step of the image frame data, and $\Delta t_d$ being a time interval between the image frame data.

In exemplary embodiments, the 'seamlessly fusing asynchronous the image frame data and the acceleration data' may include, in a Type-III time step in which both the acceleration data and the image frame data are available within a time interval [t−$\Delta t_a$, t] between the current acceleration data ($a_k$) and the subsequent acceleration data ($a_{k+1}$), obtaining a prior state estimate $$(\hat{x}_{k+1}^+)$$

of the displacement using an equation of $$\hat{x}_{k+1}^+ = \hat{x}_{k+1}^- = A(k\Delta t_a - (i-1)\Delta t_d)\hat{y}_i^+ + B(k\Delta t_a - (i-1)\Delta t_d)a_k$$

the acceleration data ($a_k$) in the Type-I time step, the posterior state estimate $$(\hat{y}_i^+)$$

of the displacement obtained in the Type-II time step, and the error covariance matrix $$(\hat{G}_i^+)$$

of the posterior state estimate $$(\hat{y}_i^+);$$

obtaining an error covariance matrix $$(\hat{P}_{k+1}^+)$$

of the prior state estimate $$(\hat{x}_{k+1}^+)$$

of the displacement using an equation of $$\hat{P}_{k+1}^+ = W_1 \hat{P}_k^+ W_1^T + qW_2 W_2^T + R_i W_3 W_3^T,$$

where $$W_1 = A(k\Delta t_a - (i-1)\Delta t_d)(I-KH)A((i-1)\Delta t_d - (k-1)\Delta t_a)$$

$$W_2 = A(k\Delta t_a - (i-1)\Delta t_d)(I-KH)B(i-1)\Delta t_d - (k-1)\Delta t_a) + B(k\Delta t_a - (i-1)\Delta t_d), \text{ and}$$

$$W_3 = A(k\Delta t_a - (i-1)\Delta t_d)K.$$

Meanwhile, a system for measuring a displacement of a structure based on fusion of asynchronous vision measurement data of natural target and acceleration data of the structure, according to embodiments to realize one object of the present invention, includes a camera installed on the structure to be measured, configured to image a stationary target outside the structure at a predetermined first sample frequency; an accelerometer installed near the camera on the structure, configured to measure acceleration at a predetermined second sample frequency; and a displacement estimation unit, implemented in a processor, comprising a scale factor calculation unit, and an adaptive multi-rate Kalman filter unit, wherein the scale factor calculation unit is configured to perform a function of calculating a scale factor (α), which is a conversion factor between a pixel resolution of the image frame data and a distance resolution of real space, using a series of image frame data taken at a predetermined first sample frequency of a stationary target outside the structure by the camera and a series of acceleration data measured at a predetermined second sample frequency by the accelerometer over time, and wherein the adaptive multi-rate Kalman filter unit is configured to perform functions of calculating a vision-based a displacement value of the structure using a feature point matching algorithm and the scale factor; and computing a displacement estimate of the structure at a sampling frequency of the acceleration data by seamlessly fusing asynchronous the acceleration data and the image frame data to be synchronized with each other with noise reduced using an adaptive multi-rate Kalman filter while using the vision-based displacement value.

In exemplary embodiments, the displacement estimation unit may include a computer program implementing the scale factor calculation unit and the adaptive multi-rate Kalman filter unit, and a processor unit for executing the computer program to perform a task of calculating the scale factor (a) and a task of calculating the displacement estimate of the structure.

In exemplary embodiments, the 'function of calculating a scale factor (α)' may include estimating a pixel-wise translation of the feature points by using with a feature point matching algorithm for comparing predetermined feature points between a reference image frame and a comparative image frame to match the same feature points; and estimating a length-wise displacement in real space by double-integrating the acceleration data.

In exemplary embodiments, the function of 'computing a displacement estimate of the structure', may include: updating a region of interest (ROI) of an $i^{th}$ image frame; matching N feature points within a ROI of a first image frame with N feature points within the ROI of the $i^{th}$ image frame using a predetermined feature point matching algorithm; rejecting feature point mismatches to leave only good feature point matches among the N feature point matches using a mismatch rejection algorithm; and computing a final translation estimate by using an equation of $$u_i = \alpha\left\{\frac{1}{N_g}\left(\sum_{j=1}^{N_g} d_i^j\right) + d_i^{ROI}\right\},$$

where $N_g$ denotes number of the good feature point matches, in which the scale factor ($\alpha$) is applied to a sum of the translations of the good feature point matches and movements of the ROIs.

Effect of the Invention

According to the exemplary embodiments of the present invention, a vision camera and an accelerometer are installed on a structure to be measured, and a natural target located outside the structure is utilized as a target for the vision camera. There is no need for a fixed support point for mounting the vision camera, and no need for prior measurement of information regarding the size of the target and the distance between the vision camera and the target. Compared to the prior art, which requires the vision camera to be installed on the outside of the structure to be measured, the present invention can lower the maintenance cost of the displacement measurement system and make it much easier to implement.

According to the exemplary embodiments of the present invention, a scaling factor can be automatically calculated that converts a displacement in the vision measurement data to a distance in real space. Further, according to exemplary embodiments of the present invention, asynchronous acceleration measurement data and vision measurement data can be fused to estimate the displacement of a structure with a high sampling rate and accuracy by using an adaptive multi-rate Kalman filter.

Furthermore, according to the exemplary embodiments of the present invention, the matching of natural targets in sequential vision images can be improved by updating the region of interest (ROI), and the accuracy of feature matching can be improved by using an automatic mismatch rejection algorithm to further improve the accuracy of the displacement measurement of the structure.

BRIEF DESCRIPTION OF THE DRAWINGS

FIG. 2 illustrates a conventional displacement estimation procedure using a feature matching algorithm.

FIGS. 7A and 7B are flowcharts illustrating a detailed procedure of a real-time displacement estimation step S200 based on the adaptive multi-rate Kalman filter and the improved feature matching algorithm, according to an exemplary embodiment of the present invention.

FIG. 11 schematically illustrates an overview of a concept of fusing asynchronous acceleration measurements and vision measurements using an adaptive multi-rate Kalman filter, in accordance with an exemplary embodiment of the present invention.

FIG. 12 illustrates an exemplary process of fusing asynchronous acceleration measurements and vision measurements using the adaptive multi-rate Kalman filter, in accordance with an exemplary embodiment of the present invention.

DETAILED DESCRIPTION OF THE EMBODIMENTS

Figure 1:
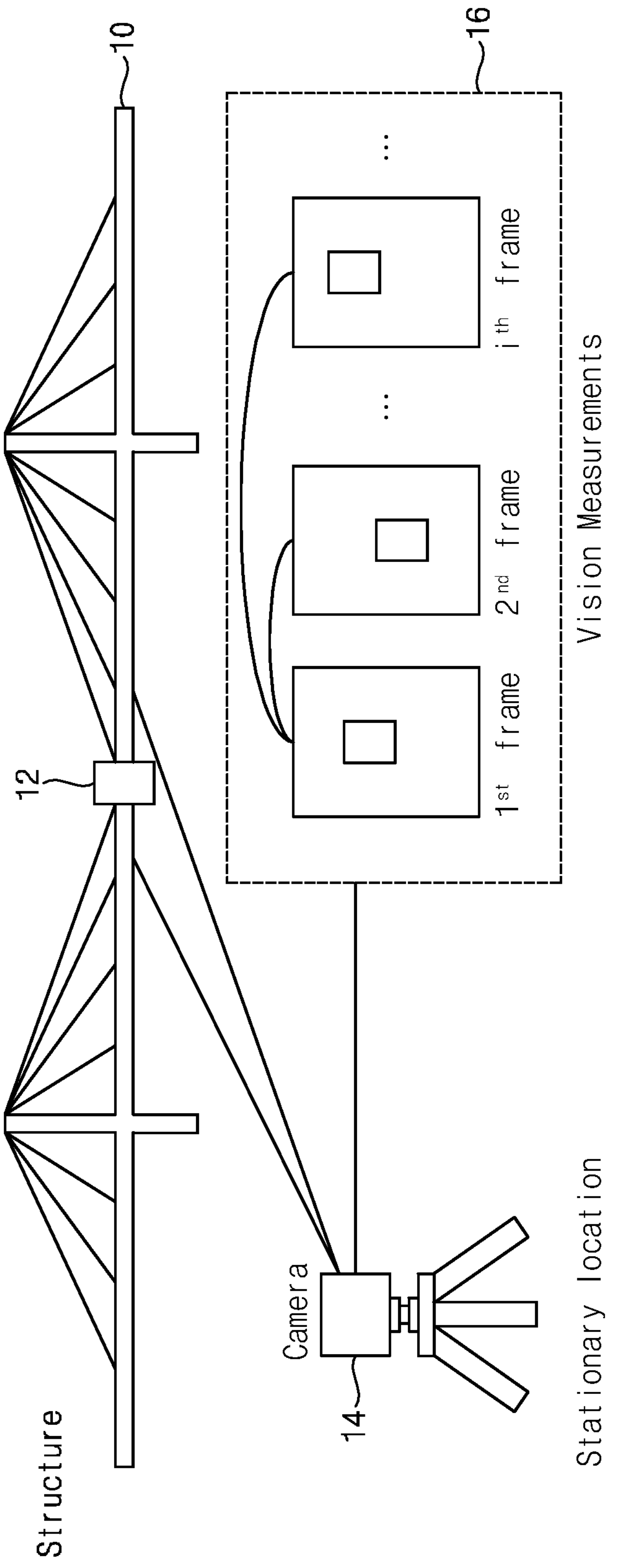
FIG. 1 schematically illustrates a conventional feature point-based displacement estimation method using a vision camera.

Hereinafter, preferred embodiments of the present invention will be described in more detail with reference to the accompanying drawings. The same reference numerals are used for identical components in the drawings, and duplicate descriptions of the same components are omitted.

The terminologies used in the present invention are used to describe specific embodiments only and are not intended to limit the invention. The singular expression includes the plural unless the context clearly indicates otherwise. In this application, the terms 'includes' or 'has' and the like are intended to designate the presence of the features, numbers, steps, actions, components, parts, or combinations thereof recited in the specification, and not to preclude the possibility of the presence or addition of one or more other features, numbers, steps, actions, components, parts, or combinations thereof. Further, terms such as first, second, and the like may be used to describe various components, but the components are not to be limited by such terms. The terms are used only to distinguish one component from another.

First, to better understand the concepts of the present invention, it is necessary to understand the basic concept of a feature point-based displacement estimation method using a vision camera. FIG. 1 schematically illustrates a conventional feature matching-based displacement estimation method using a vision camera. Generally, a vision camera 14 is usually installed at a stationary location away from a bridge 10 which is a target structure, and measures a natural or artificial target 12 existing or installed on the bridge 10. The target 12 must be within the field of view (FOV) of the vision camera 14. Of the series of image frames taken by the vision camera 14, the $1^{st}$ image frame may be utilized as a reference frame, and the feature matching algorithm may be applied to the $1^{st}$ and $i^{th}$ frames to estimate the relative displacement of the target at the it frame with respect to the target at the $1^{st}$ frame. A detailed procedure is illustrated in FIG. 2.

FIG. 2 illustrates a conventional displacement estimation procedure using a feature matching algorithm. Although only vertical displacement estimation procedure is illustrated in FIG. 2, the described displacement estimation technique can be easily extended to horizontal displacement estimation.

Referring to FIG. 2, a region of interest (ROI) 22 may first be selected from the two image frames $\mathbf{20}_1$ and $\mathbf{20}_i$ to be compared (see (a) of FIG. 2). The size and location of the ROI 22 may include a target of interest (TOI) 24 of the $1^{st}$ image frame 201, and the same ROI 22 may be maintained within the subsequent image frames.

Feature points in the region of interest 22 of the two image frames 201, **20*i* are detected and matched to each other (see (b) in FIG. 2). The feature points $M_1^1, M_1^2, \ldots, M_1^N$ detected from the $1^{st}$ ROI 22 of the first image frame $\mathbf{20}_1$ are matched with the corresponding feature points $M_i^1$, $M_1^2, \ldots, M_i^N$ within the $i^{th}$ ROI 22** of the $i^{th}$ image frame $\mathbf{20}_i$. Here, the two matched feature points, such as $M_1^1$ and $M_i^1$ depicted in FIG. 2(*b*), are named as a feature match or simply a match. There are several algorithms known in the art that can be used for feature finding and matching (Lowe, 2004; Bay et al., 2006; Rublee et al., 2011), which can be applied to the present invention. In particular, the speeded up robust features (SURF) (Bay, Tuytelaars and Van Gool, 2006) technique may be used for the present invention because of its high accuracy and computational speed.

Then, the relative shift, $d_i^j$, of the $j^{th}$ feature match ($M_1^j$, $M_i^j$) between the $1^{st}$ image frame $\mathbf{20}_1$ and the $i^{th}$ image frame $\mathbf{20}_i$ may be calculated. The averaged relative translation, $d_i$, of the relative shifts of N feature points, $M_1^1, M_1^2, \ldots, M_1^N$, may be calculated by the following equation (see FIG. 2(*c*)), $$d_i = \frac{1}{N}\sum_{j=1}^{N} d_i^j \tag{1}$$

Here, N is the number of feature points matched. The translation in pixel units may be converted to displacement, $u_i$, in spatial length units using a scale factor $\alpha$(see FIG. 2(*d*)). In other words, the scale factor $\alpha$ is a conversion factor for converting the pixel resolution of the video image to spatial resolution.

$$u_i = \alpha \times d_i \tag{2}$$

Here, the scale factor $\alpha$ may be estimated using the following equation.

$$\alpha = \frac{u_{target}}{d_{target}} \tag{3}$$

Here $u_{target}$ represents the actual physical size of the artificial or natural target and $d_{target}$ represents the corresponding size of the same target in pixel units.

Figure 3:
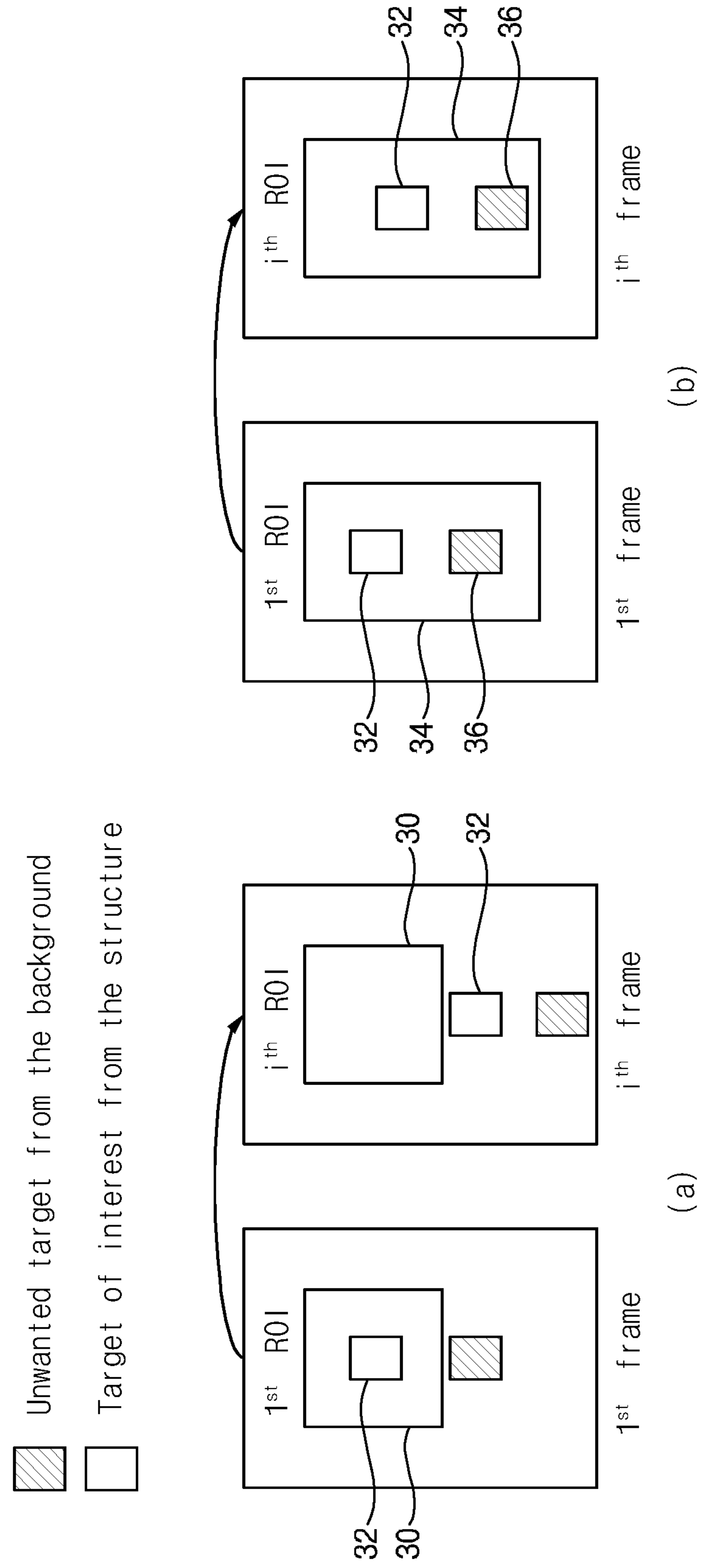
FIG. 3 is a drawing to illustrate some limitations of a typical displacement measurement technique.

However, this conventional displacement estimation technique has several limitations. FIG. 3 is a diagram to illustrate this. First, the maximum displacement should be estimated in advance to determine the size of the ROI. Because the location of the ROI is fixed for all frames, the TOI 32 may move outside the ROI 30 when the TOI movement is too large compared to the ROI size. This can be seen in FIG. 3(*a*). Nevertheless, as shown in FIG. 3(*b*), enlarging the size of ROI 34 may require more computations, and increase the possibility of capturing unwanted targets 36 inside the ROI 34. Second, conventional feature matching algorithms often produce mismatching, which impairs the displacement estimation accuracy. When two unrelated features (e.g., $M_1^1$ and $M_i^2$ in FIG. 2(*b*)) are matched for displacement estimation, this phenomenon is called a mismatch. Although several mismatch rejection algorithms have been proposed, they have limitations in implementation, such as demanding user interactions to establish the ad-hoc threshold or being computationally intensive, making real-time estimation difficult. Third, the size and length of the target must be known in advance to estimate the scale factor, which can be cumbersome for civil infrastructure applications.

On the other hand, a vision-based displacement estimation method requires a lot of computation, so the vision-based displacement estimation method is often limited to a low-sampling rate. To compensate for this, attempts have been made to estimate displacements at higher sampling rates by fusing low-sampling rate vision-based displacement measurements and high-sampling rate acceleration measurements with a multi-rate Kalman filter. The working principle of the multi-rate Kalman filter is briefly summarized as follows.

Letting $\dot{x}_k$ and $x_k$ represent the true velocity and displacement, respectively, at the $k^{th}$ time step, a discrete state space model for the acceleration-displacement relationship can be expressed as follows.

$$x_k = A(\Delta t_a)x_{k-1} + B(\Delta t_a)a_{k-1} + B(\Delta t_a)w_{k-1} \tag{4}$$

$$u_k = Hx_k + v_k, \tag{5}$$

Here $x_k$ is a state variable $\{x_k, \dot{x}_k\}^T$ and, $a_{k-1}$ and $u_k$ are the measured acceleration and vision-based displacement, respectively, $w_{k-1}$ and $v_k$ are the corresponding noises with variances Q and R, respectively. $\Delta t_a$ is the time interval of the acceleration measurement. H is a vector [1, 0]. A and B are functions of the acceleration measurement time interval $\Delta t_a$.

$$A(\Delta t_a) = \begin{bmatrix} 1 & \Delta t_a \\ 0 & 1 \end{bmatrix}, B(\Delta t_a) = \begin{bmatrix} \Delta t_a^2/2 \\ \Delta t \end{bmatrix} \tag{6}$$

Based on this model, a multi-rate Kalman filter is formulated for displacement estimation using acceleration and vision-based displacement sampled at different sampling rates, but synchronously. Here, synchronous measurement indicates that the sampling rate of the acceleration measurement is an integer multiple of that of the vision-based displacement. The prior state estimate, $$\hat{x}_k^-,$$

may be obtained using the posterior state estimate, $$\hat{x}_{k-1}^+,$$

and the acceleration, $a_{k-1}$, at the 'previous time step' as shown in the equation below.

$$\hat{x}_k^- = A(\Delta t_a)\hat{x}_{k-1}^+ + B(\Delta t_a)a_{k-1} \quad (7)$$

The error covariance matrix, $$\hat{P}_k^-,$$

of the prior state estimate, $$\hat{x}_k^-,$$

is also obtained as $$\hat{P}_k^- = A(\Delta t_a)\hat{P}_{k-1}^+ A^T(\Delta t_a) + qB(\Delta t_a)B^T(\Delta t_a) \quad (8)$$

Here $$\hat{P}_{k-1}^+$$

denotes the error covariance matrix of $$\hat{x}_{k-1}^+.$$

When both the vision-based displacement, $u_k$, and acceleration are available at the $k^{th}$ time step, the Kalman gain (K) at that time is calculated as $$K = \hat{P}_k^- H^T (H\hat{P}_k^- H^T + R)^{-1} \quad (9)$$

And a posterior state estimate, $$\hat{x}_k^+,$$

and its error covariance matrix, $$\hat{P}_k^+,$$

are obtained as follows.

$$\hat{x}_k^+ = (I - KH)\hat{x}_k^- + Ku_k \quad (10)$$

$$\hat{P}_k^+ = (I - KH)\hat{P}_k^- \quad (11)$$

If only acceleration data is available at the $k^{th}$ time step but the vision-based displacement, $u_k$, is not available, the posterior state estimate of the displacement is equal to the prior state estimate, as shown in the two equations below, and the error covariance matrixes of these two estimates are also equal to each other.

$$\hat{x}_k^+ = \hat{x}_k^- \quad (12)$$

$$\hat{P}_k^+ = \hat{P}_k^- \quad (13)$$

This Kalman filter is applicable only when acceleration and vision measurement data are synchronized and the ratio of their sampling rates is an integer. In addition, the performance of the Kalman filter relies significantly on the estimation of Q and R. While the Q value for acceleration measurement can be estimated in a laboratory setting, the estimation of the R value for vision-based displacement is difficult because this value is highly influenced by light conditions, distance between the vision camera and the target, and texture of the target. An adaptive estimation technique for the noise variance R is required.

Figure 4:
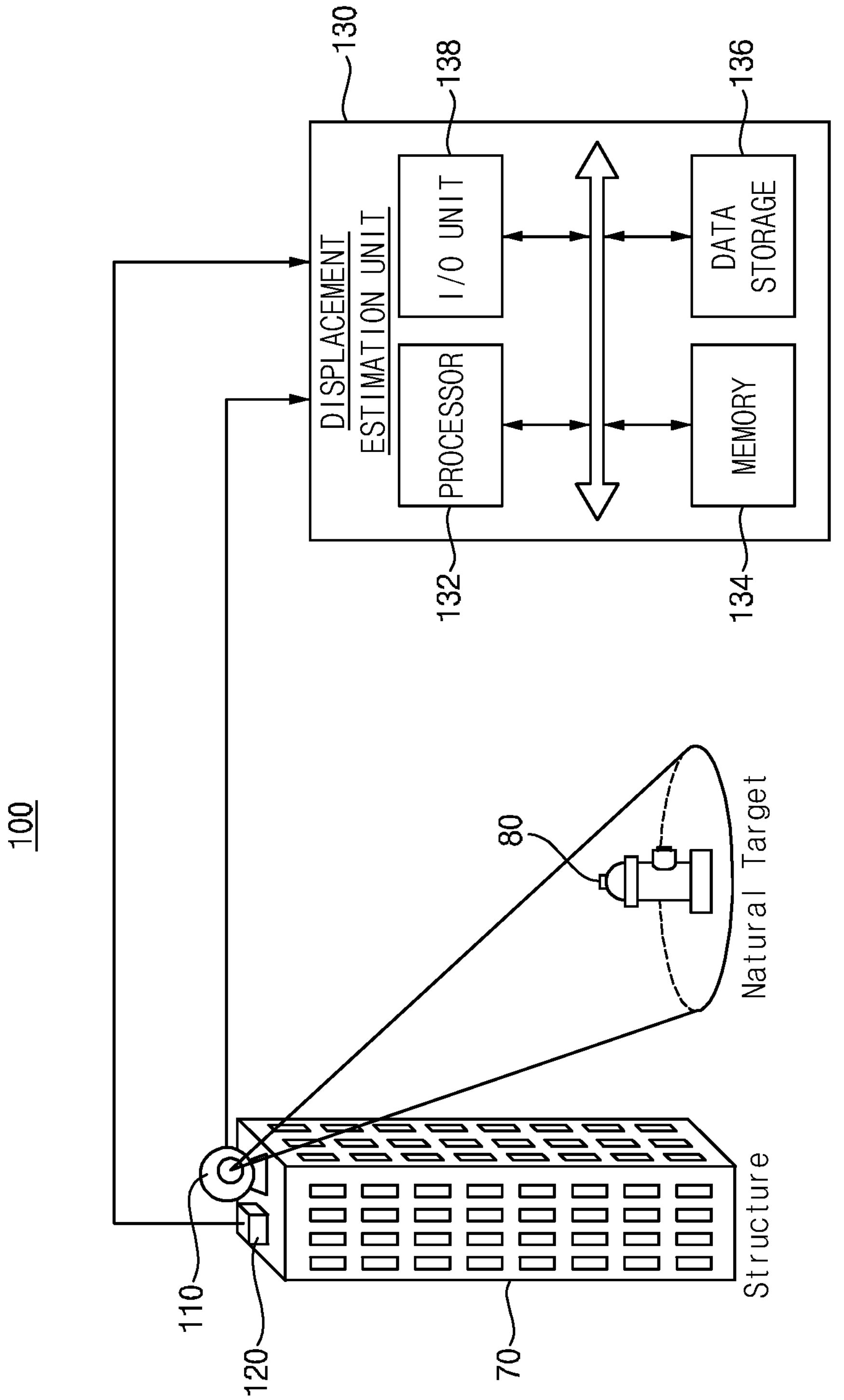
FIG. 4 schematically illustrates a system for performing a structure displacement estimation method according to an exemplary embodiment of the present invention.

To address the above-mentioned limitations, a new displacement estimation method is provided according to an exemplary embodiment of the present invention. FIG. 4 schematically illustrates a system for performing a structure displacement estimation method according to an exemplary embodiment of the present invention.

Referring to FIG. 4, a structure displacement estimation system 100 may include a vision camera 110, an accelerometer 120, and a displacement estimation unit 130. The vision camera 110 may include a camera for recording video and an analysis program for analyzing the recorded video. The vision camera 110 and the accelerometer 120 may be disposed on the structure 70 to be displacement-measured. That is, the vision camera 110, which has a relatively low sampling rate, may be placed at desired points on the structure 70 to track natural targets 80 around the structure 70. The accelerometer 120 may also be placed at the same location as the vision camera 110 to measure acceleration at a relatively high sampling rate. The target 80 may be selected from stationary objects that exist outside of the structure 70 and do not change their positions.

The displacement estimation unit 130 may be configured to calculate the displacement of the structure 70, given the vision measurement data of the target 80 from the vision camera 110 and the acceleration data of the structure 70 from the accelerometer 120. To this end, the displacement estimation unit 130 may include a computer program for estimating the displacement implemented according to the algorithm described herein, and hardware resources capable of executing the computer program to perform computational processing to produce the desired displacement estimate. The hardware resources for the displacement estimation unit 130 may include a computing device including a processor 132. In addition to the processor 132, the computing device may include memory 134, data storage 136 that is a non-volatile storage device, input/output devices 138, and the like. For example, the hardware of the displacement estimation unit 130 may include a general purpose or present invention-specific computer device, workstation device, or the like that includes the above means.

Figure 5:
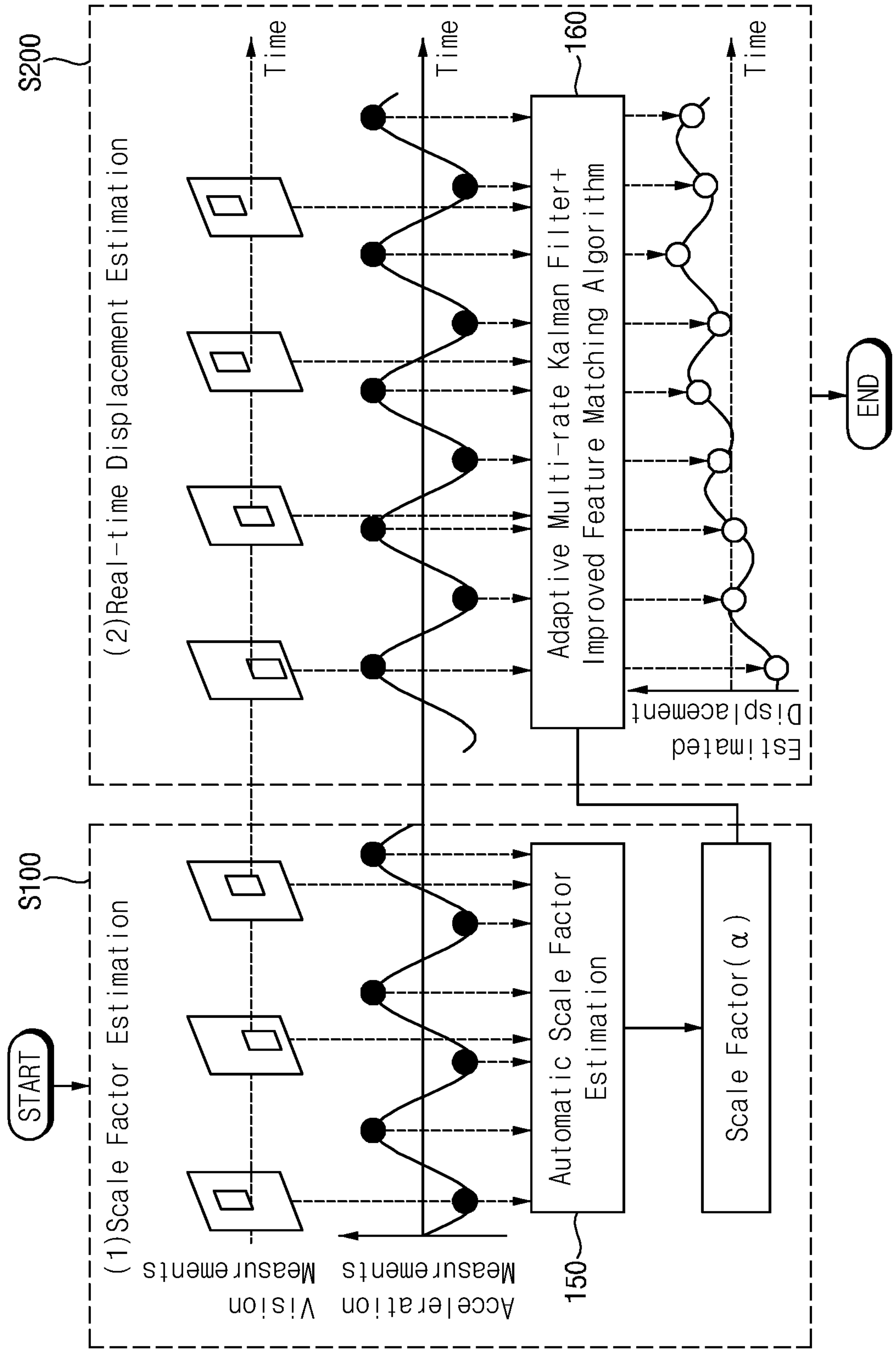
FIG. 5 schematically illustrates an overview of a structure displacement estimation method according to the exemplary embodiment of the present invention.

FIG. 5 schematically illustrates a general overview of a structure displacement estimation method according to an exemplary embodiment of the present invention.

Referring to FIG. 5, the structure displacement estimation method may broadly include a scale factor calculation step S100 in which a scale factor is automatically calculated by a scale factor calculation unit 150, and a displacement estimation step S200 in which a displacement of the structure 70 is estimated in real time based on an adaptive multi-rate Kalman filter unit 160 and an improved feature matching algorithm.

Figure 6:
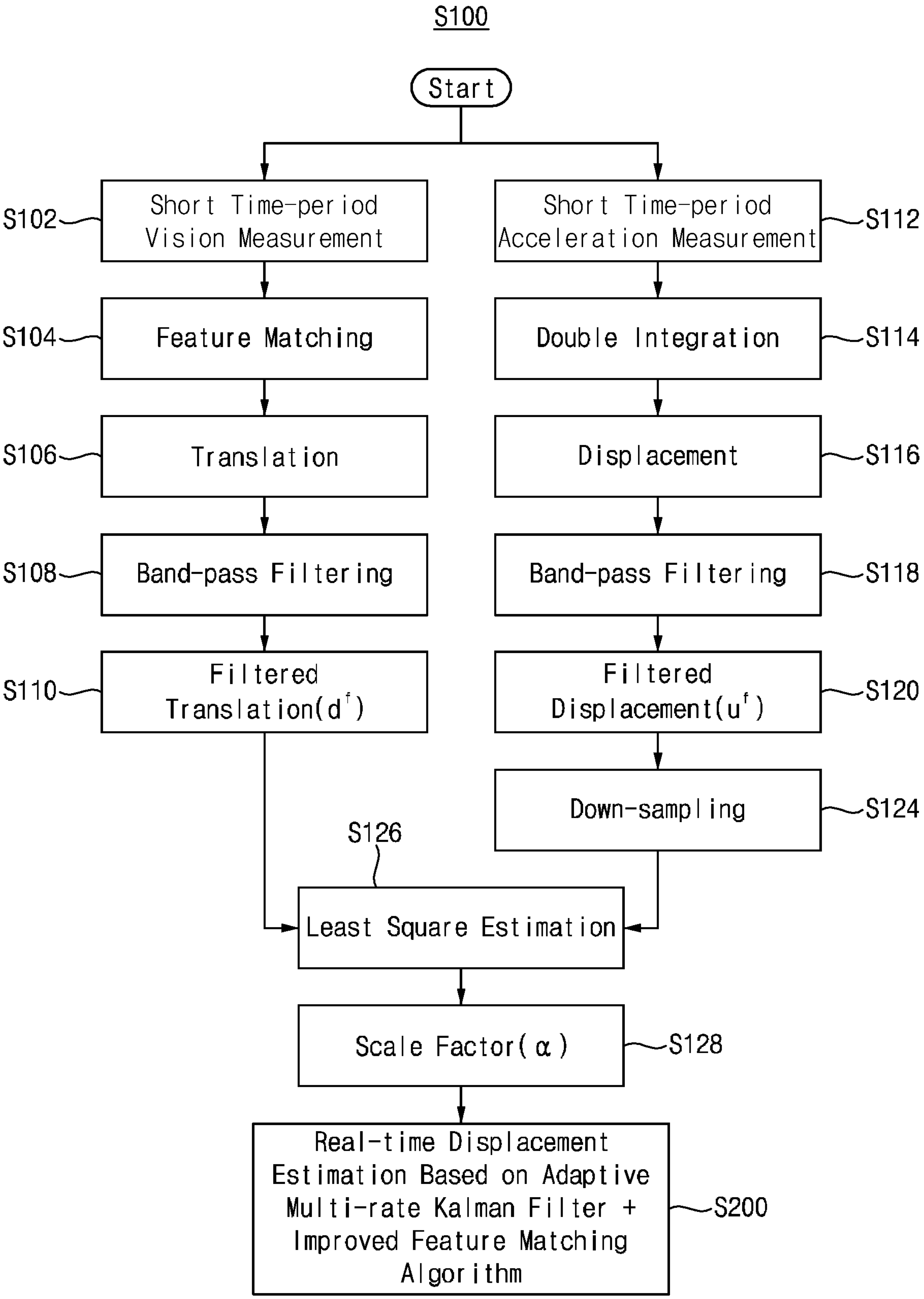
FIG. 6 is a flow diagram illustrating a detailed process of performing the scale factor calculation step shown in FIG. 5.

FIG. 6 is a flow chart illustrating a detailed procedure of performing the scale factor calculation step S100 shown in FIG. 5.

Referring to FIG. 6, vision measurement data taken by the vision camera 110 and acceleration data measured by the accelerometer 120 are used for the calculation of the scale factor. The calculation of the scale factor may be performed by the scale factor calculation unit 150 of the displacement estimation unit 130. The scale factor calculation unit 150 may be implemented as a computer program to be executed by the processor 132. The scale factor calculation unit 150 may cause the processor 132 to receive vision measurement data taken by the vision camera 110 and acceleration data measured by the accelerometer 120, from the vision camera 110 and the accelerometer 120, respectively (S102, S112). The imaging of the vision camera 110 and the measurement of the accelerometer 120 may occur at short time intervals, and the sampling rate of the vision measurement data may be slower than the sampling rate of the acceleration data.

In the vision measurement data, i.e., a series of image frames taken over time, a pixel-by-pixel translation of the feature points may be estimated by applying a feature matching algorithm that compares predetermined feature points between a reference image frame (e.g., the first image frame) and a comparison target image frame (e.g., the it image frame) to match the same feature points, as described in FIG. 2 (S104, S106). The translation of the feature points may be estimated using Equation (1) or the like described above. The displacement in length units in real space can be estimated using double integration the measured acceleration data over time, (S114, S116).

The previously obtained translation estimates and displacement estimates may be subjected to band-pass filtering to remove noise (S108, S118). Here, $d^f(t)$ represents the bandpass filtered translation and $u^f(t)$ represents the bandpass filtered displacement (S110, S120). In bandpass filtering, lowercut-off frequency of the band-pass filter, $f_{lc}$, may be set high enough to eliminate the acceleration signal distortion, i.e., the low-frequency drift in the acceleration-based displacement, and the upper cut-off frequency of the band-pass filter, $f_{uc}$, may be set considering the sampling rate of the vision camera 110. For example, the upper cut-off frequency, $f_{uc}$, may be set to about 1/10 of the sampling rate of the vision camera 110, so that the sampling rate of the vision camera 110 can be at least 10 times faster than the highest frequency of the signal, i.e., the frequency component of the vision measurement data. In other words, if there is a frequency band in the time domain that is desired to be identified, the data must be acquired at a sampling rate that is at least 10 times faster.

The following relationship exists between the filtered translation, $d^f(t)$, and the filtered displacement, $u^f(t)$, with the scale factor ($\alpha$).

$$u^f(t) = \alpha \times d^f(t) \tag{14}$$

In an exemplary embodiment, the scale factor, $\alpha$, may be estimated using a least-squares algorithm (S126). As another example, the scale factor, $\alpha$, may be estimated using a RANdom SAmple Consensus (RANSAC) algorithm. Using either the least-squares algorithm or the RANSAC algorithm, the translation estimate, $d^f(t)$, may be compared to the displacement estimate, $u^f(t)$, to obtain the slope between the two values, which is the desired scale factor, $\alpha$.

To match the sampling rate of the displacement, $\mu^f(t)$, with the sampling rate of the translation, $d^f(t)$, the bandpass-filtered displacement, $u^f(t)$, may be down-sampled to the sampling rate of the vision camera 110 before applying the least-squares algorithm (S126). Through this processing, the displacement estimate can be synchronized to the translation estimate The obtained scale factor, $\alpha$, may be used in the step S200 of displacement estimation (S128).

Figure 7A:
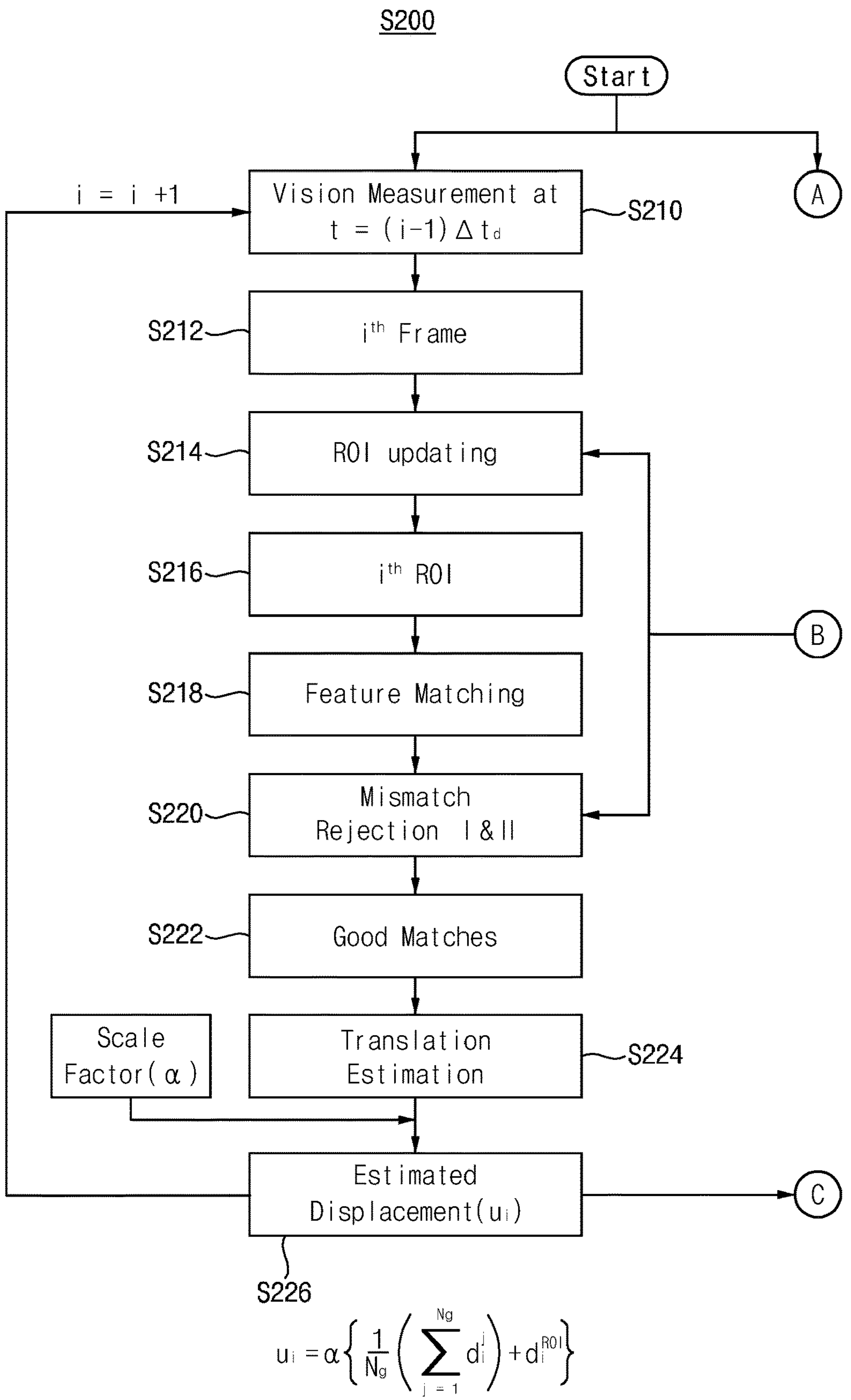

FIGS. 7*a* and 7*b* illustrate detailed performances of the real-time displacement estimation step S200 based on the adaptive multi-rate Kalman filter and the improved feature matching algorithm, according to an exemplary embodiment of the present invention.

The displacement estimation step S200 may be performed in the adaptive multi-rate Kalman filter unit 160. The adaptive multi-rate Kalman filter unit 160 may be implemented as a computer program and executed by the processor 132.

Referring to FIGS. 7A and 7B, the adaptive multi-rate Kalman filter unit 160 may cause the processor 132 to read the vision measurement data, provided by the vision camera 110 and stored in the data storage 136, in frame-by-frame increments while incrementing the frame index, i, by one (S210, S212). The series of image frames may be taken at a first predetermined time interval, $\Delta t_d$, over time, t.

Compared to conventional feature point matching, a major improvement of the method proposed by the present invention may be the addition of a ROI update and two mismatch rejection algorithms. The position of the ROI in successive image frames may change over time due to, for example, the movement of the structure 70. The present invention uses correlation-based template matching. The template matching relies little on user intervention, except for the initial selection of the ROI that is considered a template. The template matching method is sensitive to background and illumination changes. Therefore, for long-term recordings (e.g., more than a few hours), it may be necessary to periodically update the ROI template to mitigate error accumulation. The improved feature matching algorithm can make vision-based displacement measurements more reliable. To improve reliability, an ROI (hereinafter referred to as the '$i^{th}$ ROI') within the current $i^{th}$ image frame can be updated (S214, and S216). Using the prior state estimate of the displacement in length unit, $$\hat{y}_i^-,$$

, which may be obtained in step S234 of FIG. 7B, the $i^{th}$ ROI may be updated.

Figure 8:
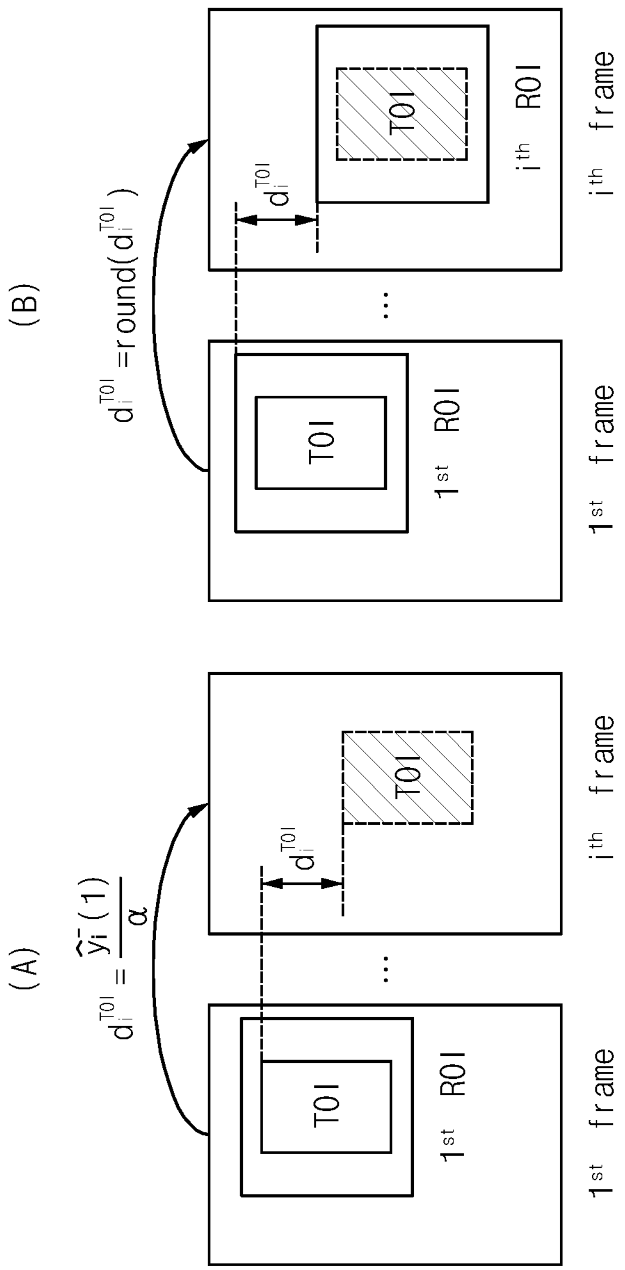
FIG. 8 illustrates a working principle of a region of interest (ROI) updating algorithm according to an exemplary embodiment of the present invention.

FIG. 8 illustrates the working principle of a ROI updating algorithm according to an exemplary embodiment of the present invention.

Referring to FIG. 8, the translation, $$d_i^{TOI},$$

in pixel units of the target of interest (TOI) may be obtained using the prior state estimate, $$\hat{y}_i^-(1),$$

of the estimated lengthwise displacement. Since the prior state estimate, $$\hat{y}_i^-(1),$$

of the estimated lengthwise displacement is in units of displacement, it can be converted to the pixel units using the equation below with the scale factor.

$$d_t^{TOI} = \frac{\hat{y}_i^-(1)}{\alpha} \quad (15)$$

The prior state estimate, $$\hat{y}_i^-(1),$$

of the displacement in length units represents the first term of $$\hat{y}_i^-.$$

The ROI in $i^{th}$ image frame, $i^{th}$ ROI, is displaced using the translation, $$d_i^{TOI},$$

in pixel units of TOI. The translation, $$d_i^{TOI},$$

of the $i^{th}$ ROI is discretized on a pixel-by-pixel basis. Therefore, the $$d_i^{TOI}$$

of the $i^{th}$ ROI can be obtained using a 'round' function as follows.

$$d_i^{ROI} = \text{round}\left(\frac{\hat{y}_i^-(1)}{\alpha}\right) \quad (16)$$

The translation, $$d_i^{TOI},$$

of the $i^{th}$ ROI may be used to update the position of the $i^{th}$ ROI of the $i^{th}$ image frame.

After the $i^{th}$ ROI of the $i^{th}$ image frame is updated, feature point matching may be performed between N feature points in the ROI of first image frame, P ROI, and N feature points in the ROI of updated $i^{th}$ image frame, $i^{th}$ ROI, using a predetermined feature matching algorithm (S218). A conventional feature matching algorithm may be used.

However, among the N feature point matches, there may be some correct matches and some mismatches, i.e., incorrectly matched features. For accurate translation estimation in image frames, it is important to ensure that the associated feature points match each other with high confidence, as shown in FIG. 2*b*. However, the conventional feature matching techniques often lead to feature point mismatches. This reduces the accuracy of the translation and scale factor. For high confidence displacement measurements, a mismatch rejection algorithm may be used to reject mismatches from the N feature point matches, leaving only good feature point matches (S220, S222). The mismatches can be rejected by two rejection algorithms using a prior state estimate, $$\hat{y}_i^-,$$

of the lengthwise displacement and its error covariance matrix, $$\hat{G}_i^-,$$

produced in step S234. Eventually, only the remaining high-confidence feature point matches are used for displacement estimation, thereby increasing the reliability of the displacement measurements.

In an exemplary embodiment, the first and second feature point mismatch rejection algorithms may be performed sequentially on the matched feature matches.

First, the first feature point mismatch rejection algorithm may include two steps, broadly as follows: (1) selecting the best feature match among the feature matches (see FIG. 8), and (2) rejecting mismatch by cross-checking the remaining feature matches against the best feature match (see FIG. 9). After performing the first feature point mismatch rejection algorithm, the second feature point mismatch rejection algorithm may be performed on the remaining feature matches. The basic assumption in rejecting feature point mismatches is that the distance between two feature points in the image plane does not change over time.

First, the first-stage rejection of feature point mismatches using the first feature point mismatch rejection algorithm will be described below.

Figure 9:
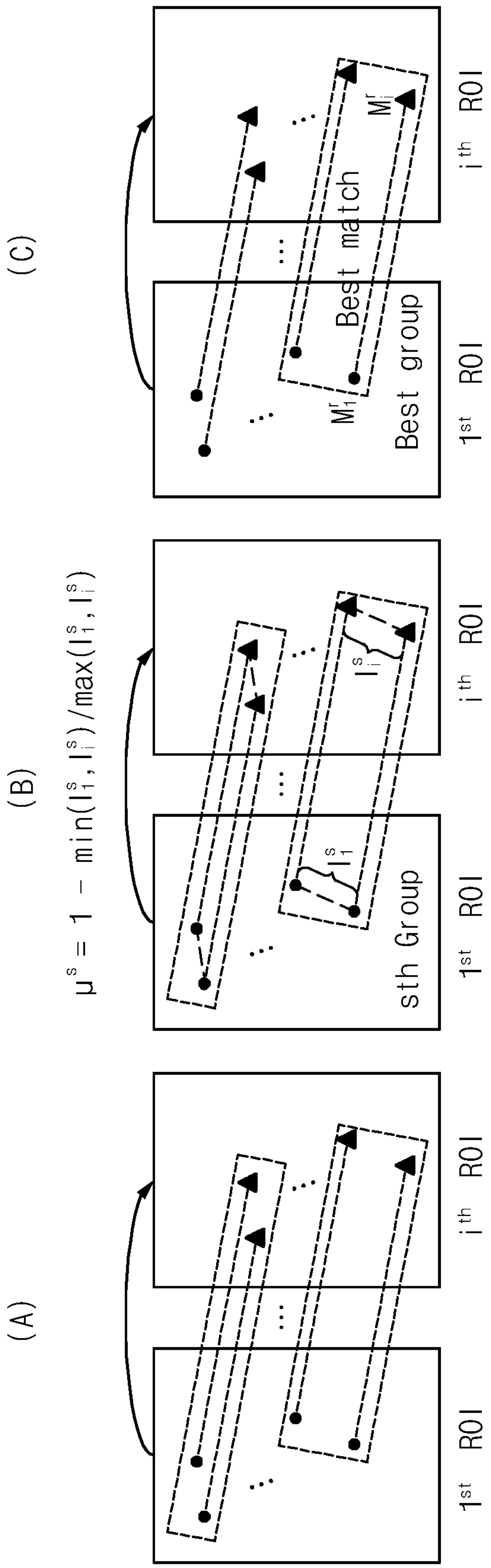
FIG. 9 schematically illustrates a method for selecting the best match among the feature point matches in image frames according to an exemplary embodiment of the present invention.

FIG. 9 schematically illustrates a method for selecting the best match among the feature point matches in image frames, according to an exemplary embodiment of the present invention.

Referring to FIGS. 6 and 9, selecting the best match may be the first step. First, the feature point matches may be grouped into two groups, as shown in FIG. 9(A). Assuming that the ROI of first image frame, $1^{st}$ ROI, and the ROI of $i^{th}$ image frame, $i^{th}$ ROI, each contain N feature points, N feature point matches are obtained from the $1^{st}$ ROI and the $i^{th}$ ROI by applying the feature matching algorithm. Here, each feature point match may consist of one feature point selected from the $1^{st}$ ROI and one feature point selected from the $i^{th}$ ROI. Among the N feature point matches, two feature point matches may be randomly selected to form a group of matches. This grouping may be repeated for all N feature point matches to create N/2 match groups. If N is odd, the remaining feature point matches may be ignored when grouping, which results in (N−1)/2 match groups. Each match group contains two feature points in the $1^{st}$ ROI and the corresponding two feature points in the $i^{th}$ ROI (see FIG. 9(A)).

After constructing N/2 or (N−1)/2 match groups as above, the distance variation index of each match group can be calculated, as shown in FIG. 9(B). The distance variation index can be calculated using the following equation.

$$\mu^s = 1 - \min(l_1^s, l_i^s)/\max(l_1^s, l_i^s) \tag{17}$$

Here $\mu^s$ denotes a distance variation index of the $s^{th}$ match group (where s is a natural number less than N/2 or (N−1)/2). In addition, $$l_1^s$$

is a distance between two feature points of the $s^{th}$ match group within the ROI of the first image frame, and $$l_i^s$$

is a distance between two features points of the $s^{th}$ match group within the ROI of the $i^{th}$ image frame.

The value of the distance variation index should be close to zero for a group with two good matches. Therefore, as shown in FIG. 9(*c*), the match group with the smallest distance variation index ($\mu^s$) value among the calculated N/2 or (N−1)/2 distance variation indexes may be selected as the best match group. One out of the two feature point matches belonging to the best match group may be defined as the best match. In FIG. 9(*c*), for example, the $r^{th}$ feature match, $$(M_l^r, M_i^r),$$

is exemplified as the best match.

Figure 10:
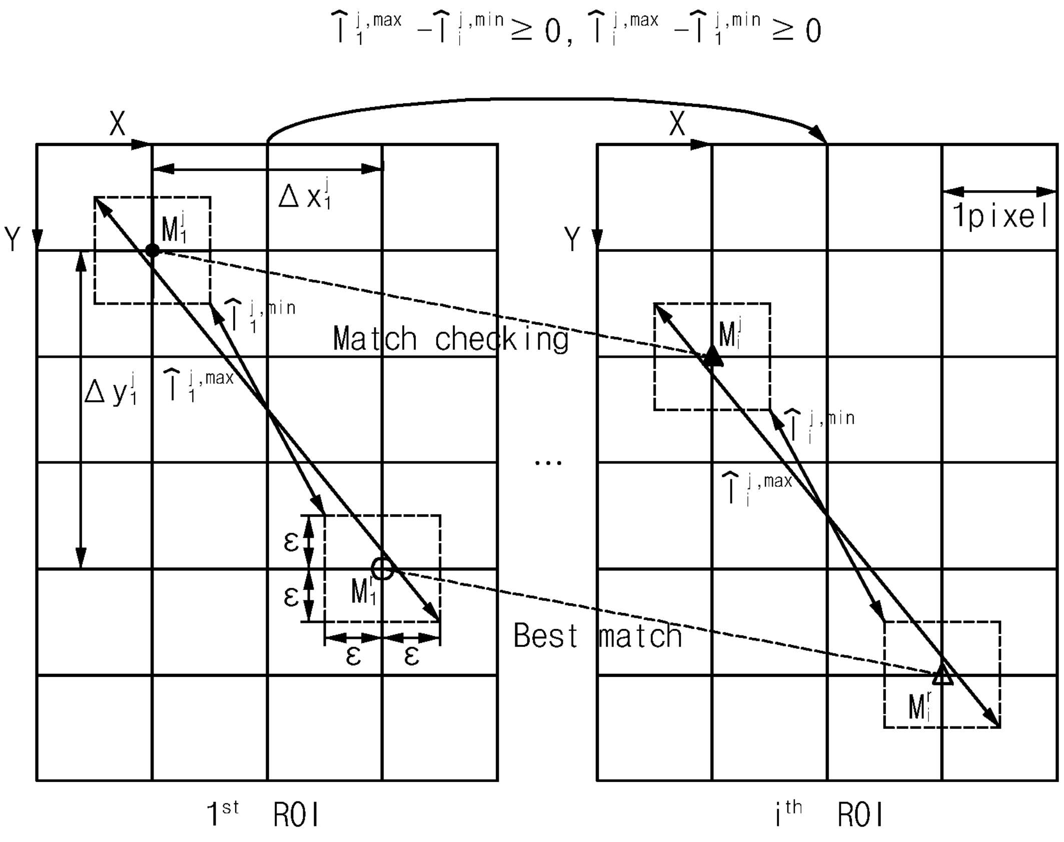
FIG. 10 schematically illustrates a method for cross-checking the remaining matches against the best match to eliminate mismatches, according to an exemplary embodiment of the present invention.

FIG. 10 schematically illustrates a method for cross-checking the remaining matches against the best match to reject mismatches, according to an exemplary embodiment of the present invention.

FIG. 10 illustrates calculating distance intervals for the remaining matches based on the best match.

Referring to FIG. 10, once the best match, e.g., $$(M_1^r, M_i^r)$$

is selected, distance intervals may be calculated for each of the remaining feature matches based on the selected best match to determine and reject mismatches. Specifically, in the first image frame, the true distance between any feature point, e.g., $$M_1^j,$$

and the best match feature point, $$M_1^r,$$

within the $1^{st}$ ROI falls between the maximum distance, $$l_1^{j,max},$$

and the minimum distance, $$l_1^{j,min},$$

as shown in FIG. 9. Here, j=1, 2, . . . , N and j≠r.

In the first image frame, the maximum distance, $$l_1^{j,min},$$

and the minimum distance, $$\hat{l}_1^{j,min}$$

between any feature point, $$M_1^i,$$

and the best match feature point, $$M_1^r,$$

within the $1^{st}$ ROI may be expressed as follows.

$$\begin{cases} \hat{l}_1^{j,min} = \sqrt{(|\Delta x_1^j| - 2\varepsilon)^2 + (|\Delta y_1^j| - 2\varepsilon)^2} \\ \hat{l}_1^{j,max} = \sqrt{(|\Delta x_1^j| + 2\varepsilon)^2 + (|\Delta y_1^j| + 2\varepsilon)^2} \end{cases} \quad (18)$$

Here, ε denotes the maximum pixel discretization error in both the x-axis and the y-axis directions, and in FIG. 9, the value is exemplarily set to 0.5 pixels. In addition, $$\Delta x_i^j \text{ and } \Delta y_i^j$$

denote the difference between the x- and y-coordinate values of feature point, $$M_1^j,$$

and feature point, $$M_{1,}^r,$$

respectively.

Similarly, the maximum distance, $$\hat{l}_i^{j,max},$$

and minimum distance, $$\hat{l}_i^{j,min}$$

between an arbitrary feature point, $$M_i^j,$$

and the best match feature point, $$M_i^r,$$

within the $i^{th}$ ROI of the $i^{th}$ image frame can also be computed using Equation (18).

Eventually, in this way, both the maximum and minimum distances to the remaining feature points with respect to the best match feature points within each ROI of the first and $i^{th}$ image frames can be calculated.

It may be determined whether the computed maximum distance, $$\hat{l}_1^{j,max},$$

and the minimum distance, $$\hat{l}_1^{j,min},$$

within the ROI of the first image frame and the computed the maximum distance, $$\hat{l}_i^{j,max},$$

and minimum distance, $$\hat{l}_i^{j,min},$$

within the ROI of the $i^{th}$ image frame satisfy the following two distance interval conditions, where, j=1, 2, . . . , N, and j≠r.

(i) Distance Interval Condition 1: The 'maximum distance between the $j^{th}$ feature point and the best match feature point within the ROI of the first image frame' is not less than the 'minimum distance between the $j^{th}$ feature point and the best match feature point within the ROI of the $i^{th}$ image frame'; and (ii) Distance Interval Condition 2: The 'maximum distance between the $j^{th}$ feature point and the best match feature point within the ROI of the $i^{th}$ image frame' is not less than the 'minimum distance between the $j^{th}$ feature point and the best match feature point within the ROI of the first image frame.

Equation (19) below shows the two conditions. As a result of the judgment, the feature point match that does not satisfy the following equation is classified as a mismatch and can be rejected.

$$\hat{l}_1^{j,max} - \hat{l}_i^{j,min} \geq 0, \hat{l}_i^{j,max} - \hat{l}_1^{j,min} \geq 0 \quad (19)$$

After rejecting feature point mismatches by applying a first feature point mismatch rejection algorithm, a second feature point mismatch rejection algorithm may be applied to reject feature point mismatches. The improved feature point matching algorithm can further increase the reliability of the vision-based displacement measurements.

Specifically, after being filtered by the first feature point mismatch rejection algorithm, a translation $$d_i^j$$

may be computed for each of the remaining feature point matches. A 99.7% confidence interval can be estimated for the translation $$d_i^j,$$

assuming that the error in the prior state estimate, $$\hat{y}_i^-,$$

of the displacement in length unit has a normal distribution with covariance, $$\hat{G}_i^-(1, 1)$$

. The range of translation $$d_i^j$$

can be expressed by the following equation.

$$\frac{\hat{y}_i^-(1)}{\alpha} - \frac{\sqrt[3]{\hat{G}_i^-(1, 1)}}{\alpha} - 2\varepsilon - d_i^{ROI} \le d_i^j \le \frac{\hat{y}_i^-(1)}{\alpha} + \frac{\sqrt[3]{\hat{G}_i^-(1, 1)}}{\alpha} + 2\varepsilon - d_i^{ROI} \tag{20}$$

Here, the covariance error, $$\hat{G}_j^-(1, 1),$$

denotes the first term of the covariance error matrix, $$\hat{G}_i^-,$$

of the prior state estimate of the displacement. The pixel discrete error, ε, may be considered within the estimation of this confidence interval. Feature point matches that do not fall within this confidence interval are considered mismatches and are rejected.

In this way, the first and second feature point mismatch rejection algorithms may be performed to reject the feature matches classified as mismatches, and the remaining feature point matches may be obtained as good matches (S222).

The good matches may be used to estimate a translation (S224). The final translation is estimated as the summation of the averaged translations of all remaining good matches and ROI movements.

By applying the scaling factor, α, obtained in step S100 to the sum of the final translation, a desired displacement, $u_i$, of the structure 70 can be estimated (S224). In an exemplary embodiment, the displacement, $u_i$, may be calculated using the equation below (S226).

$$u_i = \alpha\left\{\frac{1}{N_g}\left(\sum_{j=1}^{N_g} d_i^j\right) + d_i^{ROI}\right\} \tag{21}$$

Here $N_g$ is the number of good matches, i.e., high confidence matches.

On the other hand, as mentioned above, it is assumed that in the conventional Kalman filter the acceleration data and the vision measurement data used for data fusion are time synchronized. However, as mentioned above, the measurement rates of the vision camera 110 and the accelerometer 120 may be asynchronous. The adaptive multi-rate Kalman filter unit 160 according to the exemplary embodiment can fuse seamlessly the time acceleration data and the vision-based data which are asynchronous. In addition, the frames per second (FPS) of the vision camera 110 may not remain precisely constant over time (e.g., 30 FPS) in real shooting, but rather may vary (e.g., 29.5 FPS, 30.3 FPS, etc.). The adaptive multi-rate Kalman filter unit 160 allows for adaptive estimation of this noise variance R with respect to the vision-based displacement.

FIG. 11 schematically illustrates an overview of a concept of fusing asynchronous acceleration measurement data and vision measurement data using the adaptive multi-rate Kalman filter unit, in accordance with an exemplary embodiment of the present invention. FIG. 12 illustrates an exemplary process of fusing asynchronous acceleration measurement data and vision measurement data using the adaptive multi-rate Kalman filter unit, in accordance with an exemplary embodiment of the present invention.

Referring to FIGS. 11 and 12 in conjunction with FIG. 7*b*, acceleration data, $a_k$, measured by accelerometer 120 over time may have a time interval of $\Delta t_a$. At a $k^{th}$ time step, the acceleration data, $a_k$, may be input to the Kalman filter unit 160 of the displacement estimation unit 130 (S230), where k is an index of the acceleration data.

In the Kalman filter unit 160, all time steps may be categorized into three types according to the availability of acceleration and vision measurement data. The state estimates at acceleration steps may be retained so that the final estimated displacement has the same sampling rate as the acceleration measurement, i.e., the sample frequency of the resulting displacement may be equal to the sample frequency of the relatively higher acceleration data.

The image frame data ($i^{th}$ frame) captured by the vision camera 110 may have a time interval of $\Delta t_d$. On a time scale, the image frame data may or may not lie between two adjacent acceleration data. The Kalman filter according to an exemplary embodiment may be formulated for three different types of time steps.

(i) Type-I time step (180-1): In this time step, only the current acceleration data, $a_k$, is available, and no image frame data is available within the time interval $[t-\Delta t_a, t]$ between the current acceleration data $a_k$ and the previous acceleration data $a_{k-1}$.

(ii) Type-II time step (180-2): In this time step, only the image frame data ($i^{th}$ frame) is available, while the acceleration data is not available.

(iii) Type-III time step (180-3): In this time step, both acceleration data and image frame data are available within the time interval $[t-\Delta t_a, t]$ between the current acceleration data ($a_k$) and the next acceleration data ($a_{k+1}$).

The Kalman filter unit 160 of the displacement estimation unit 130 may determine whether image frame data is present in the time interval $[(k-2)\Delta t_a, (k-)\Delta t_a]$(S232).

If there is no image frame data available between the time interval $[(k-2)\Delta t_a, (k-1)\Delta t_a]$, then it corresponds to the Type-I time step 180-1. In the Type-I time step 180-1, since only acceleration data is available, the state variable $x_k$ and its covariance error matrix, $$\hat{P}_k^-,$$

can be calculated using the aforementioned Equations (7) and (8), and Equations (12) and (13), respectively (S250, S252). This is similar to the conventional Kalman filter. Specifically, at time (k−1)$\Delta t_a$, a prior state estimate, $$\hat{x}_k^-,$$

of the displacement can be calculated using Equation (7), and its prior error covariance matrix, $$\hat{P}_k^-,$$

can be obtained using Equation (8). Next, at time (k−1)$\Delta t_a$, the posterior state estimate, $$\hat{x}_k^+,$$

of the displacement is obtained using Equation (10), and its posterior error covariance matrix, $$\hat{P}_k^+,$$

is obtained using Equation (11). As mentioned in Equations (12) and (13) above, the prior and posterior state estimates, $$\hat{x}_k^- \text{ and } \hat{x}_k^+,$$

of displacement obtained in this way are identical to each other, and their error covariance matrices, $$\hat{P}_k^- \text{ and } \hat{P}_k^+,$$

are also identical to each other.

If it is determined that image frame data exists between the time intervals [(k−2)$\Delta t_a$, (k−1)$\Delta t_a$] in step S232, it may correspond to the Type-II time step 180-2 or the Type-III time step 180-3.

In the Type-II time step 180-2, the state variables and their error covariance matrices may be obtained using Equation (7) and Equation (8). At this time, however, the time interval simply changes from $\Delta t_a$ to ((i−1)$\Delta t_d$−(k−1)$\Delta t_a$), where k is the k$^{th}$ time step of the acceleration data and i is the i$^{th}$ time step of the vision measurement data. The $\Delta t_a$ is the time interval between the acceleration data and $\Delta t_d$ is the time interval between the vision measurement data. In the Type-II time step 180-2, prior state estimates, $$\hat{y}_i^-,$$

of the displacement and an error covariance matrix, $$\hat{G}_i^-,$$

of them at time t=(i−1)$\Delta t_d$ can be obtained (S234).

The obtained the prior state estimates, $$\hat{y}_i^-,$$

of the displacement and their error covariance matrix, $$\hat{G}_i^-,$$

can be used for updating the ROI of the i$^{th}$ image frame (S214, S216), as mentioned above. Furthermore, the improved first and second feature point mismatch rejection algorithms may be applied to the vision measurement data to reject feature point mismatches (S218-S222) to obtain an estimate of the vision-based displacement, $u_i$(S224-S226).

Further, a noise variance, $R_i$, of the vision-based displacement, $u_i$, can be estimated using the obtained prior state estimates, $$\hat{y}_i^-,$$

of the displacement and their error covariance matrix, $$\hat{G}_i^-,$$

and the estimated vision-based displacement, $u_i$(S236-S238). The noise variance, $R_i$, of the vision-based displacement, $u_i$, may be adaptively estimated using the Equation below (S238). This variance Equation is proposed through a known covariance matching technique (Mohamed and Schwarz, 1999).

$$R_i = E(\eta_i\eta_i^T) - H\hat{G}_i^- H^T \tag{22}$$

Here, $R_i$ denotes the noise variance of the vision-based displacement, $u_i$, and E(·) denotes the expectation operation. And, the innovation, $\eta_i$, i.e., the difference between the measured and predicted values, can be defined as follows.

$$\eta_i = u_i - H\hat{y}_i^- \tag{23}$$

Although the expected value of $$\eta_i\eta_i^T$$

may be approximated by averaging $\eta_i^2$ over a moving time window, this can be computationally intensive due to the size of the moving time window. To address this issue, a forgetting factor, $\beta$, may be used for adaptive estimation of the noise variance, $R_i$, of vision-based displacements, as shown in the equation below (Akhlaghi et al., 2017).

$$R_i = \beta R_{i-1} + (1-\beta)(\eta_i^2 - H\hat{G}_i^- H^T) \tag{24}$$

Here, the forgetting factor, β, has values in the range 0<β<1.

The noise variance, $R_i$, of the obtained vision-based displacement may be used to calculate the Kalman gain, K, (S240). The Kalman gain, K, may be calculated using Equation (9).

Once the Kalman gain, K, is obtained, it can be used to obtain the posterior state estimate, $$\hat{y}_i^+,$$

of the displacement and its error covariance matrix, $$\hat{G}_i^+,$$

in the Type-II time step (180-2), that is, at time $t=(i-1)\Delta t_d$. The posterior state estimate, $$\hat{y}_i^+,$$

of the displacement and its error covariance matrix, $$\hat{G}_i^+,$$

may be obtained using the aforementioned Equations (10) and (11) (S242).

Next, the prior state estimate and posterior state estimate of the displacement at Type-III time step (180-3) and their error covariance matrix may be obtained (S244, S246).

In the Type-III time step 180-3 where both acceleration data and image frame data are available within the time interval $[t-\Delta t_a, t]$ between the current acceleration data, $a_k$, and the subsequent acceleration data, $a_{k+1}$, during the time $k\Delta t_a-(i-1)\Delta t_a$, the prior state estimate of the displacement can be obtained using the acceleration data, $a_k$, of the Type-I time step 180-1 and the posterior state estimate, $$\hat{y}_i^+,$$

of the displacement obtained in the Type-II time step 180-2 and the error covariance matrix, $$\hat{G}_i^+,$$

thereof. Also, in this time step 180-3, the prior state and posterior state estimates of the displacement are equal. These can be estimated as follows.

$$\hat{x}_{k+1}^+ = \hat{x}_{k+1}^- = A(k\Delta t_a - (i-1)\Delta t_d)\hat{y}_i^+ + B(k\Delta t_a - (i-1)\Delta t_d)a_k \tag{25}$$

According to the relationship between $$\hat{y}_i^+ \cdot \hat{x}_k^+, u_i$$

and ak, Equation (25) can be rewritten as, $$\hat{x}_{k+1}^+ = W_1\hat{x}_k^+ + W_2 a_k + W_3 u_i, \tag{26}$$

Here, $W_1$, $W_2$, and $W_3$ are expressed as follows respectively.

$$W_1 = A(k\Delta t_a - (i-1)\Delta t_d)(I-KH)A((i-1)\Delta t_d - (k-1)\Delta t_a) \tag{27}$$

$$W_2 = A(k\Delta t_a - (i-1)\Delta t_d)(I-KH)B((i-1)\Delta t_d - (k-1)\Delta t_a) + B(k\Delta t_a - (i-1)\Delta t_d) \tag{28}$$

$$W_3 = A(k\Delta t_a - (i-1)\Delta t_d)K \tag{29}$$

Since the values of $$\hat{x}_k^+,$$

$a_k$, and $u_i$ are independent of each other, the error covariance matrix of $$\hat{x}_{k+1}^+$$

is calculated as follows.

$$\hat{P}_{k+1}^+ = W_1\hat{P}_k^+W_1^T + qW_2W_2^T + R_iW_3W_3^T \tag{30}$$

By fusing the asynchronous acceleration data and vision data with an adaptive multi-rate Kalman filter as described above, the state variable, $$\hat{x}_k^+,$$

of the displacement at time $t=(k-1)\Delta t_a$ can be estimated (S248).

As described above, the structure displacement estimation method according to an exemplary embodiment can be corrected by applying the Kalman filter since the image frames and accelerations, as heterogeneous data, are acquired in a time desynchronized manner. In this case, vision-based displacement noise that varies with resolution and shading is automatically calculated and reduced.

The structure displacement estimation method according to the embodiments described above may be software implemented in the form of program instructions that can be executed through various computing means. The software may include computer programs, code, instructions, or one or more combinations thereof, and may configure processing devices to operate as desired, or may independently or collectively instruct processing devices. The program instructions may be recorded on a computer-readable medium. The computer-readable medium may include program instructions, data files, data structures, and the like, singly or in combination. The program instructions recorded on the medium may be specifically designed and configured for the embodiment or may be known and available to those skilled in the art of computer software. Examples of computer-readable recording media include magnetic media such as hard disks, floppy disks, and magnetic tapes, optical media such as CD-ROMs and DVDs, magneto-optical media such as floptical disks, and hardware devices, such as ROMs, RAMs, flash memory, and the like, specifically configured to store and perform program instructions.

The computer means for implementing the structure displacement estimation method according to the described embodiments may be implemented using one or more general purpose or special purpose computers, such as, for example, a processor, controller, arithmetic logic unit (ALU), digital signal processor, microcomputer, field programmable array (FPA), programmable logic unit (PLU), microprocessor, or any other device capable of executing and responding to instructions.

INDUSTRIAL APPLICABILITY

The present invention may be applied to monitor the displacement of highly safety-required structures such as bridges, buildings, and the like in real time.

Although the above embodiments have been illustrated by means of limited drawings, it will be understood by those skilled in the art that various modifications and changes can be made to the present invention without departing from the ideas and scope of the present invention described in the following patent claims. Therefore, other implementations, other embodiments, and things that are equivalent to the claims of the patent are also within the scope of the following patent claims.

What is claimed is:

1. A method of measuring a displacement of a structure, comprising:

calculating a scale factor (α), which is a conversion factor between a pixel resolution of the image frame data and a distance resolution of real space, by a processor, using a series of image frame data taken at a predetermined first sample frequency of a stationary target outside the structure by a camera installed on the structure to be measured over time, and a series of acceleration data measured at a predetermined second sample frequency by an accelerometer installed on the structure; and calculating a vision-based displacement value of the structure, by the processor, using a feature point matching algorithm and the scale factor, and computing a displacement estimate of the structure at a sample frequency of the acceleration data, by the processor, by fusing asynchronous the image frame data and the acceleration data to be synchronized with each other with noise reduced using an adaptive multi-rate Kalman filter while using the vision-based displacement value, wherein the 'computing a displacement estimate of the structure' comprises updating a region of interest (ROI) of an $i^{th}$ image frame; matching N feature points within a ROI of a first image frame with N feature points within the ROI of the $i^{th}$ image frame using a predetermined feature point matching algorithm; rejecting feature point mismatches to leave only good feature point matches among the N feature point matches using a mismatch rejection algorithm; and computing a final translation estimate by using an equation of $$u_t = \alpha\left\{\frac{1}{N_g}\left(\sum_{j=1}^{Ng} d_i^j\right) + d_i^{ROI}\right\},$$

where $N_g$ denotes number of the good feature point matches, in which the scale factor (α) is applied to a sum of the translations of the good feature point matches and movements of the ROIs.

2. The method of claim 1, wherein the 'calculating a scale factor (α)' comprises estimating a pixel-wise translation of the feature points by using with a feature point matching algorithm for comparing predetermined feature points between a reference image frame and a comparative image frame to match the same feature points; and estimating a length-wise displacement in real space by double-integrating the acceleration data.

3. The method of claim 2, wherein the 'calculating a scale factor (α)' further comprises subjecting the estimate of pixel-wise translation and the estimate of length-wise displacement to bandpass filtering processing for reducing noise.

4. The method of claim 3, wherein the 'calculating a scale factor (α)' further comprises down-sampling the bandpass filtered estimate of the length-wise displacement to synchronize the estimate of the length-wise displacement with the estimate of the pixel-wise translation.

5. The method of claim 1, wherein the 'updating a ROI of an $i^{th}$ image frame' comprises converting a prior state estimate of the displacement from length-wise one to pixel-wise one using the scale factor (α); obtaining a pixel-wise displacement $$\left(d_i^{TOI}\right)$$

of a target of interest (TOI) of the $i^{th}$ image frame by using converted pixel-wise prior state estimate; obtaining a translation $$\left(d_i^{TOI}\right)$$

the $i^{th}$ ROI using a round function, $$d_i^{ROI} = \text{round}\left(\frac{\hat{y}_t^-(1)}{\alpha}\right);$$

and updating a position of the $i^{th}$ ROI using the obtained translation $$\left(d_i^{TOI}\right)$$

of the $i^{th}$ ROI.

6. The method of claim 1, wherein the 'rejecting feature point mismatches to leave only good feature point matches' comprises rejecting feature point mismatches using a first feature point mismatch rejection algorithm, wherein the first feature point mismatch rejecting algorithm comprises: selecting a best feature point match from the feature point matches; and rejecting mismatched feature points by cross-checking remaining feature points based on the best feature point match.

7. The method of claim 6, wherein the 'selecting a best feature point match' comprises: pairing N feature point matches between the ROI of the first image frame and the ROI of the $i^{th}$ image frame two by two into N/2 or (N−1)/2 feature point match groups; calculating a distance variation index of each of the N/2 or (N−1)/2 feature point match groups; selecting a match group having the smallest distance variation index ($\mu^s$) among the calculated N/2 or (N−1)/2 distance variation indices as a best match group; and selecting one of the two feature point matches belonging to the best match group as the best feature point match.

8. The method of claim 7, wherein the 'rejecting mismatched feature points' comprises: calculating a distance interval for each of the remaining feature point matches based on the best match selected to determine whether the calculated distance interval meets a mismatch condition; and rejecting, from the feature point matches, a feature point that meets the mismatch condition, leaving only good matches, wherein the mismatch condition includes first and second distance interval conditions, the first distance interval condition being that 'a maximum distance between a $j^{th}$ feature point and the best matched feature point within the ROI of the $1^{st}$ image frame' is greater than or equal to 'a minimum distance between the $j^{th}$ feature point and the best matched feature point within the ROI of the $i^{th}$ image frame', and the second distance interval condition being that 'a maximum distance between a $j^{th}$ feature point and the best matched feature point within the ROI of the $i^{th}$ image frame' is greater than or equal to 'a minimum distance between the $j^{th}$ feature point and the best matched feature point within the ROI of the $1^{st}$ image frame', where j=1, 2, . . . , N.

9. The method of claim 7, wherein the distance variation index is calculated by an equation of $$\mu^s = 1 - \min(l_1^s, l_i^s)/\max(l_1^s, l_i^s),$$

where $\mu^s$ is a distance variation index of a $s^{th}$ match group, $$l_1^s$$

is a distance between two feature points in the $s^{th}$ match group within the ROI of the $1^{st}$ image frame, and $$l_i^s$$

is a distance between two features points in the $s^{th}$ match group within the ROI of the $i^{th}$ image frame.

10. The method of claim 1, wherein the 'rejecting feature point mismatches to leave only good feature point matches' comprises rejecting the feature point mismatches using a second feature point mismatch rejection algorithm, and wherein the second feature point mismatch rejection algorithm comprises: calculating a translation $$(d_i^j)$$

for each of remaining feature point matches filtered by the first feature point mismatch rejection algorithm; and rejecting a feature point match of which translation calculated does not fall within a range of translation value $$(d_i^j)$$

expressed by an equation of $$\frac{\hat{y}_i^-(1)}{\alpha} - \frac{\sqrt[3]{\hat{G}_i^-(1,1)}}{\alpha} - 2\varepsilon - d_i^{ROI} \le d_i^j \le \frac{\hat{y}_i^-(1)}{\alpha} + \frac{\sqrt[3]{\hat{G}_i^-(1,1)}}{\alpha} + 2\varepsilon - d_i^{ROI}$$

as mismatches.

11. The method of claim 1, wherein the fusing asynchronous the image frame data and the acceleration data' comprising; in a Type-I time step in which only a current acceleration data ($a_k$) is available and no image frame data is available in a time interval $[(k-2)\Delta t_a, (k-1)\Delta t_a]$ between the current acceleration data ($a_k$) and a previous acceleration data ($a_{k-1}$), obtaining a prior state estimate $$(\hat{x}_k^-)$$

of the displacement and an error covariance matrix $$(\hat{P}_k^-)$$

of the prior state estimate $$(\hat{x}_k^-)$$

using a first equation, $$\hat{x}_k^- = A(\Delta t_a)\hat{x}_{k-1}^+ + B(\Delta t_a)a_{k-1},$$

and a second equation, $$\hat{P}_k^- = A(\Delta t_a)\hat{P}_{k-1}^+ A^T(\Delta t_a) + qB(\Delta t_a)B^T(\Delta t_a),$$

respectively; and at time $(k-1)\Delta t_a$, obtaining a posterior state estimate $$(\hat{x}_k^+)$$

and a posterior error covariance matrix $$(\hat{P}_k^+)$$

of the posterior state estimate $$(\hat{x}_k^+)$$

corresponding to the prior state estimate $$(\hat{x}_k^-)$$

and the error covariance matrix $$(\hat{P}_k^-)$$

of the prior state estimate $$(\hat{x}_k^-),$$

where $\Delta t_a$ denotes a time interval between the acceleration data, k denotes a $k^{th}$ time interval of the acceleration data, and $$\hat{x}_{k-1}^+$$

and $a_{k-1}$ denotes the posterior state estimate and acceleration data, respectively, at a 'previous time step', and $$A(\Delta t_a) = \begin{bmatrix} 1 & \Delta t_a \\ 0 & 1 \end{bmatrix}, B(\Delta t_a) = \begin{bmatrix} \Delta t_a^2/2 \\ \Delta t \end{bmatrix}.$$

12. The method of claim 11, wherein the fusing asynchronous the image frame data and the acceleration data' comprising; in a Type-II time step in which only the image frame data is available and the acceleration data is not available within a time interval [(k−2)$\Delta t_a$, (k−1)$\Delta t_a$], obtaining a prior state estimate $$(\hat{y}_i^-)$$

of the displacement and a prior error covariance matrix $$(\hat{G}_i^-)$$

of the prior state estimate $$(\hat{y}_i^-)$$

of the displacement using the first and second equations, with changing the time interval from $\Delta t_a$ to (i−1)$\Delta t_d$−(k−1)$\Delta t_a$; updating the ROI of the $i^{th}$ image frame using the obtained prior state estimate $$(\hat{y}_i^-)$$

and the prior error covariance matrix $$(\hat{G}_i^-)$$

thereof; obtaining a vision-based displacement ($u_i$) estimate by applying the obtained prior state estimate $$(\hat{y}_i^-)$$

and the prior error covariance matrix $$(\hat{G}_i^-)$$

thereof to the feature point mismatch rejection based on the first and second feature point mismatch rejection algorithms; obtaining a noise variance ($R_i$) of the vision-based displacement ($u_i$) by using the obtained prior state estimate $$(\hat{y}_i^-)$$

of the displacement, the prior error covariance matrix $$(\hat{G}_i^-)$$

thereof, and the vision-based displacement ($u_i$) estimate; calculating a Kalman gain (K) using an equation of $$K = \hat{P}_k^- H^T \left(H\hat{P}_k^- H^T + R\right)^{-1}$$

and the obtained noise variance ($R_i$) of the vision-based displacement ($u_i$); and calculating a posterior state estimate $$(\hat{y}_i^-)$$

of the displacement at time t=(i−1)$\Delta t_d$ and an error covariance matrix $$(\hat{G}_i^-)$$

thereof using equations $$\hat{x}_k^+ = (I - KH)\hat{x}_k^- + Ku_k \text{ and } \hat{P}_k^+ = (I - KH)\hat{P}_k^-$$

and the Kalman gain (K), where in the above equations, x and P are represented by y and G, respectively, H being a vector [1, 0], i being an $i^{th}$ time step of the image frame data, and Ata being a time interval between the image frame data.

13. The method of claim 12, wherein the fusing asynchronous the image frame data and the acceleration data' comprising; in a Type-III time step in which both the acceleration data and the image frame data are available within a time interval [t−$\Delta t_a$, t] between the current acceleration data ($a_k$) and the subsequent acceleration data ($a_{k+1}$), obtaining a prior state estimate $$(\hat{x}_{k+1}^{+})$$

of the displacement using an equation of $$\hat{x}_{k+1}^{+} = \hat{x}_{k+1}^{-} = A(k\Delta t_a - (i-1)\Delta t_d)\hat{y}_i^{+} + B(k\Delta t_a - (i-1)\Delta t_d)a_k,$$

the acceleration data ($a_k$) in the Type-I time step, the posterior state estimate $$(y_i^{+})$$

of the displacement obtained in the Type-II time step, and the error covariance matrix $$(\hat{G}_i^{+})$$

of the posterior state estimate $$(\hat{y}_i^{+});$$

obtaining an error covariance matrix $$(P_{k+1}^{+})$$

of the prior state estimate $$(\hat{x}_{k+1}^{+})$$

of the displacement using an equation of $$\hat{P}_{k+1}^{+} = W_1\hat{P}_k^{+}W_1^T - +qW_2W_2^T + R_iW_3W_3^T,$$

where $$W_1=A(k\Delta t_a-(i-1)\Delta t_d)(I-KH)A((i-1)\Delta t_d-(k-1)\Delta t_a)$$

$$W_2=A(k\Delta t_a-(i-1)\Delta t_d)(I-KH)B(i-1)\Delta t_d-(k-1)\Delta t_a)+B(k\Delta t_a-(i-1)\Delta t_d),\text{ and}$$

$$W_3=A(k\Delta t_a-(i-1)\Delta t_d)K.$$

14. A system for measuring a displacement of a structure, comprising:

a camera installed on the structure, configured to image a stationary target outside the structure at a predetermined first sample frequency;

an accelerometer collocated with the camera on the structure, configured to measure acceleration at a predetermined second sample frequency; and a displacement estimation unit, implemented in a processor, comprising a scale factor calculation unit, and an adaptive multi-rate Kalman filter unit, wherein the scale factor calculation unit is configured to perform a function of calculating a scale factor (α), which is a conversion factor between a pixel resolution of the image frame data and a distance resolution of real space, using a series of image frame data taken at a predetermined first sample frequency of a stationary target outside the structure by the camera and a series of acceleration data measured at a predetermined second sample frequency by the accelerometer over time, and wherein the adaptive multi-rate Kalman filter unit is configured to perform functions of calculating a vision-based displacement value of the structure using a feature point matching algorithm and the scale factor; and computing a displacement estimate of the structure at a sampling frequency of the acceleration data by fusing asynchronous the acceleration data and the image frame data to be synchronized with each other with noise reduced using an adaptive multi-rate Kalman filter while using the vision-based displacement value, wherein the function of 'computing a displacement estimate of the structure', comprises: updating a region of interest (ROI) of an $i^{th}$ image frame; matching N feature points within a ROI of a first image frame with N feature points within the ROI of the $i^{th}$ image frame using a predetermined feature point matching algorithm; rejecting feature point mismatches to leave only good feature point matches among the N feature point matches using a mismatch rejection algorithm; and computing a final translation estimate by using an equation of $$u_t = \alpha\left\{\frac{1}{N_g}\left(\sum_{j=1}^{N_g} d_i^j\right) + d_i^{ROI}\right\},$$

where $N_g$ denotes number of the good feature point matches, in which the scale factor (α) is applied to a sum of the translations of the good feature point matches and movements of the ROIs.

15. The system of claim 14, wherein the displacement estimation unit comprises a computer program implementing the scale factor calculation unit and the adaptive multi-rate Kalman filter unit, and a processor unit for executing the computer program to perform a task of calculating the scale factor (α) and a task of calculating the displacement estimate of the structure.

16. The system of claim 14, wherein the 'function of calculating a scale factor (α)' comprises estimating a pixel-wise translation of the feature points by using with a feature point matching algorithm for comparing predetermined feature points between a reference image frame and a comparative image frame to match the same feature points; and estimating a length-wise displacement in real space by double-integrating the acceleration data.

* * * * *